INVENTOR.
George O'Neal, Jr.
BY
Harness, Dickey & Pierce
ATTORNEYS

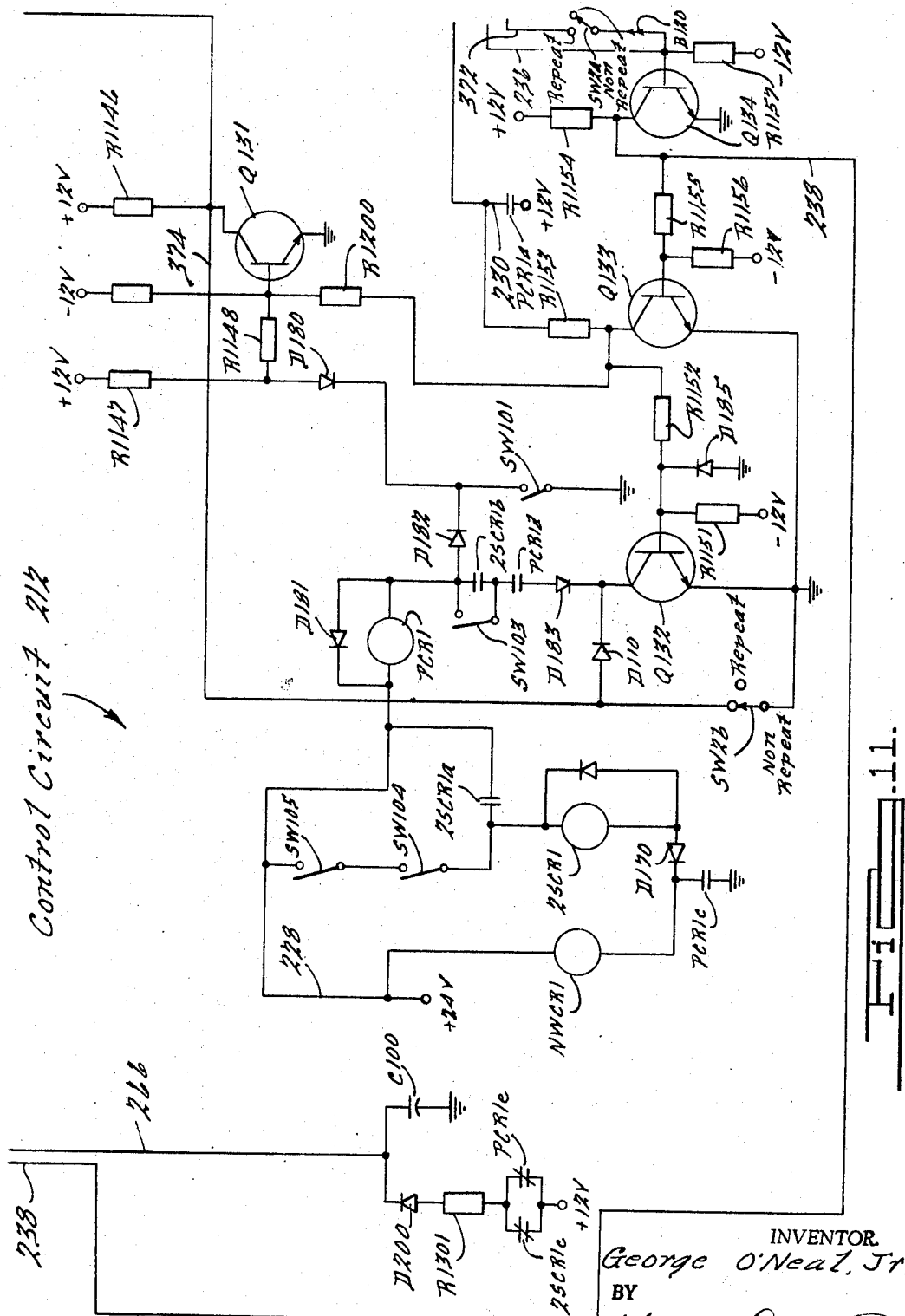

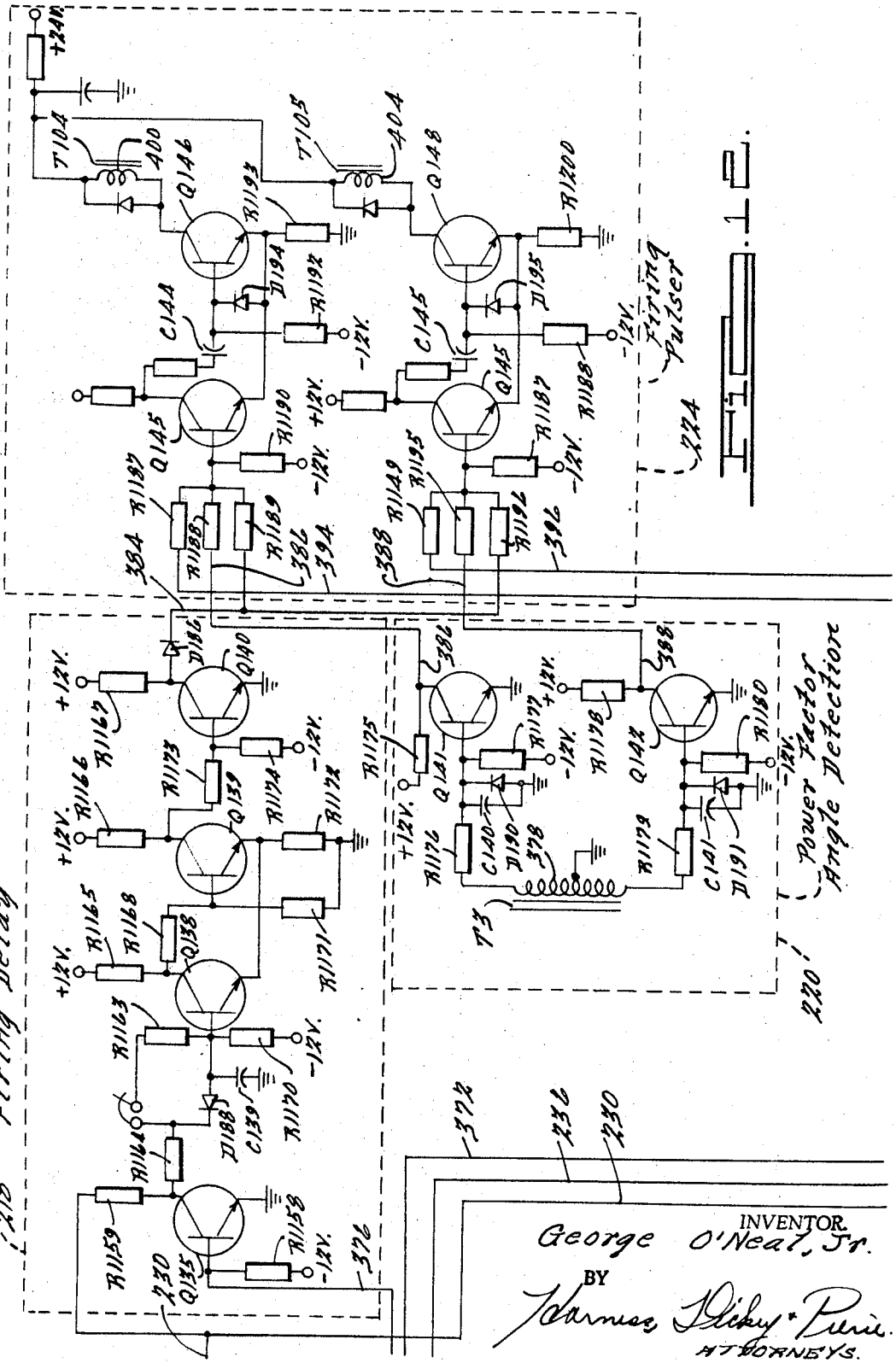

United States Patent Office 3,452,283
Patented June 24, 1969

3,452,283
TIMER
George O'Neal, Jr., Detroit, Mich., assignor to Weltronic Company, Southfield, Mich., a corporation of Michigan
Continuation-in-part of application Ser. No. 305,342, Aug. 29, 1963. This application Feb. 23, 1965, Ser. No. 439,499
Int. Cl. H03k 17/00, 21/32
U.S. Cl. 328—75                                56 Claims This application is a continuation-in-part of my application Ser. No. 305,342 filed Aug. 29, 1963.

This invention relates to timers and more particularly to timers suitable for controlling welding operations.

In the prior practices, welding timers have conventionally either been electromagnetic or electronic in nature or a combination of the two. With the advent and substantial commercial perfection of solid-state devices, it was recognized that substantial advantage could be achieved by converting to solid-state systems. The illustrated arrangement is, with the exception of certain minor relaying functions and the final output devices, fully a solid-state system. In the designing of this system, certain unique problems were faced and resolved, and a teaching of those problems and of the nature of their resolution is presented herein.

An object of this invention is to improve welding timers.

Another object of this invention is to minimize the possibility of improper operation of the system under any of a variety of predictable circumstances.

Another object of this invention is to create in a system normally capable of timing a selected function to a minimum of a count of one, the capability of restricting the duration of that function to an interval much less than a count of one.

Another object of this invention is an improved means for maintaining a system in operation for the duration of a preselected series of events.

Another object of this invention is an improved means for delaying the initiation of a selected function for a preselected interval.

Another object of this invention is an improved means for deriving timing pulses from an alternating current source.

Another object of this invention is to synchronize timing pulses with the zero degree point of an alternating current signal.

Another object of this invention is an improved means to preclude racing in a multiple function apparatus and to insure that sequential functions occur in the proper sequence.

Another object of this invention is to utilize any selected output of a first pulse counter to step a second pulse counter and to change the setting of the first pulse counter.

Another object of this invention is to employ a source of accurately controlled pulses to step a first counter and, under the selective control of the first counter, to step a second counter.

Another object of this invention is to simplify and improve a matrix associable with a binary counter to produce a selected output indication at a preselected decimal count.

Another object of this invention is to protect a silicon controlled rectifier against rapid changes of voltage in a firing circuit for ignitrons or the like.

A further object of this invention is to protect a silicon controlled rectifier against excessive peak back voltages in a firing circuit for an ignitron or the like.

Another object of this invention is to insure that the establishment of an inadequate contact at a selector switch connected to a counter for timing a function will not result in excessive timing of the function.

The manner of accomplishing the foregoing objects and other objects and features of this invention may be perceived from the following detailed description of an embodiment of the invention when read with reference to the accompanying drawings in which.

Figure 8:
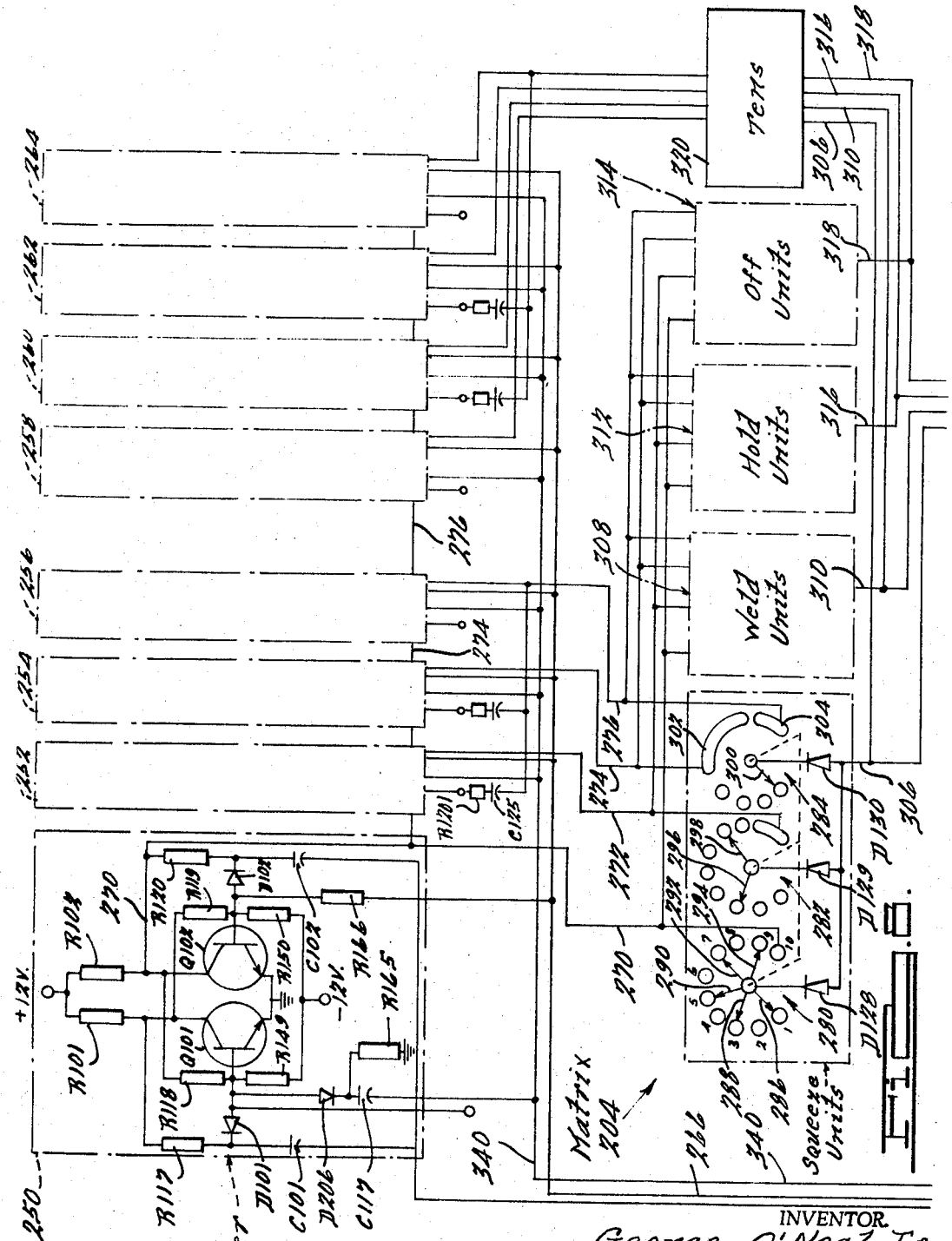
Figure 9:
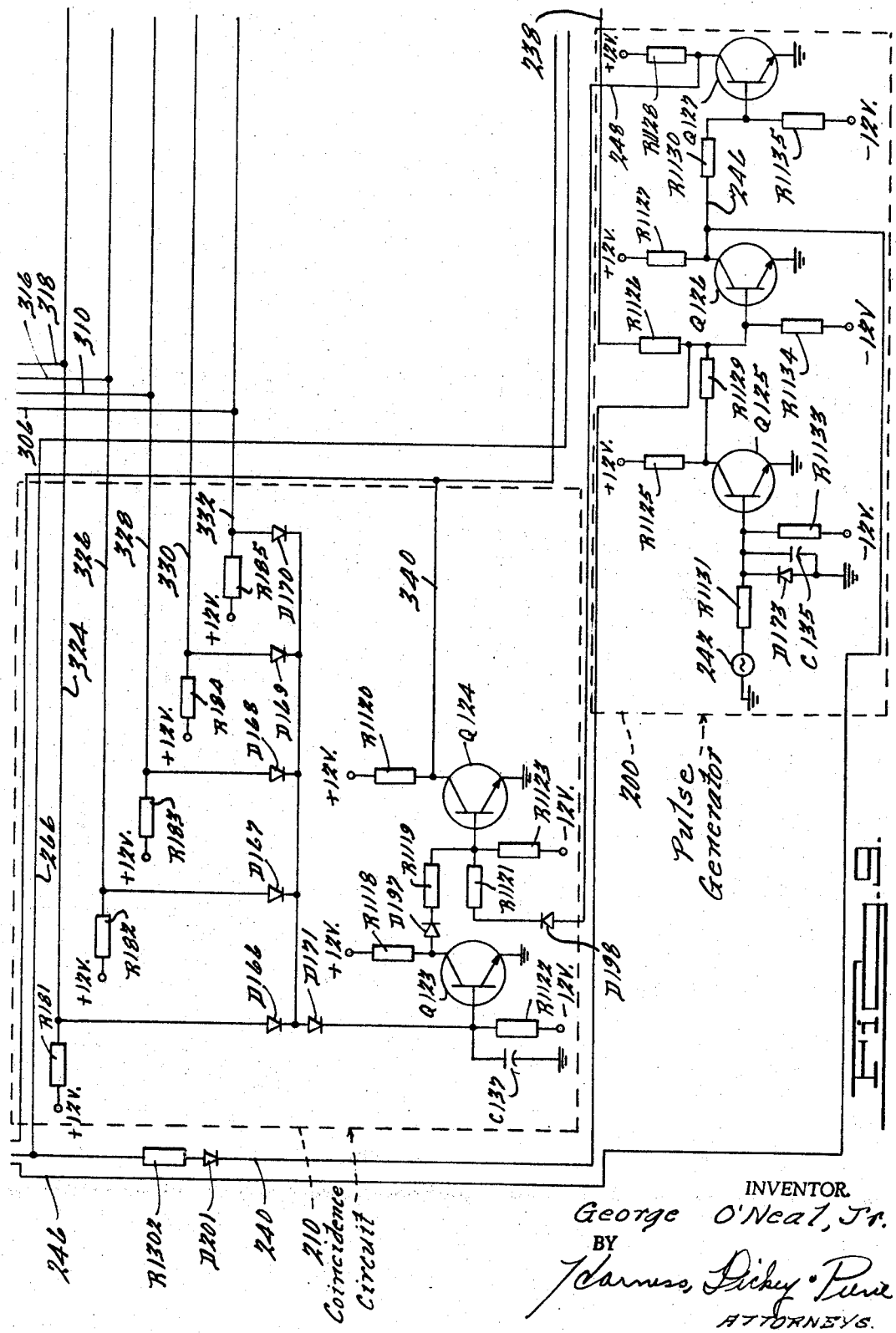
Figure 10:
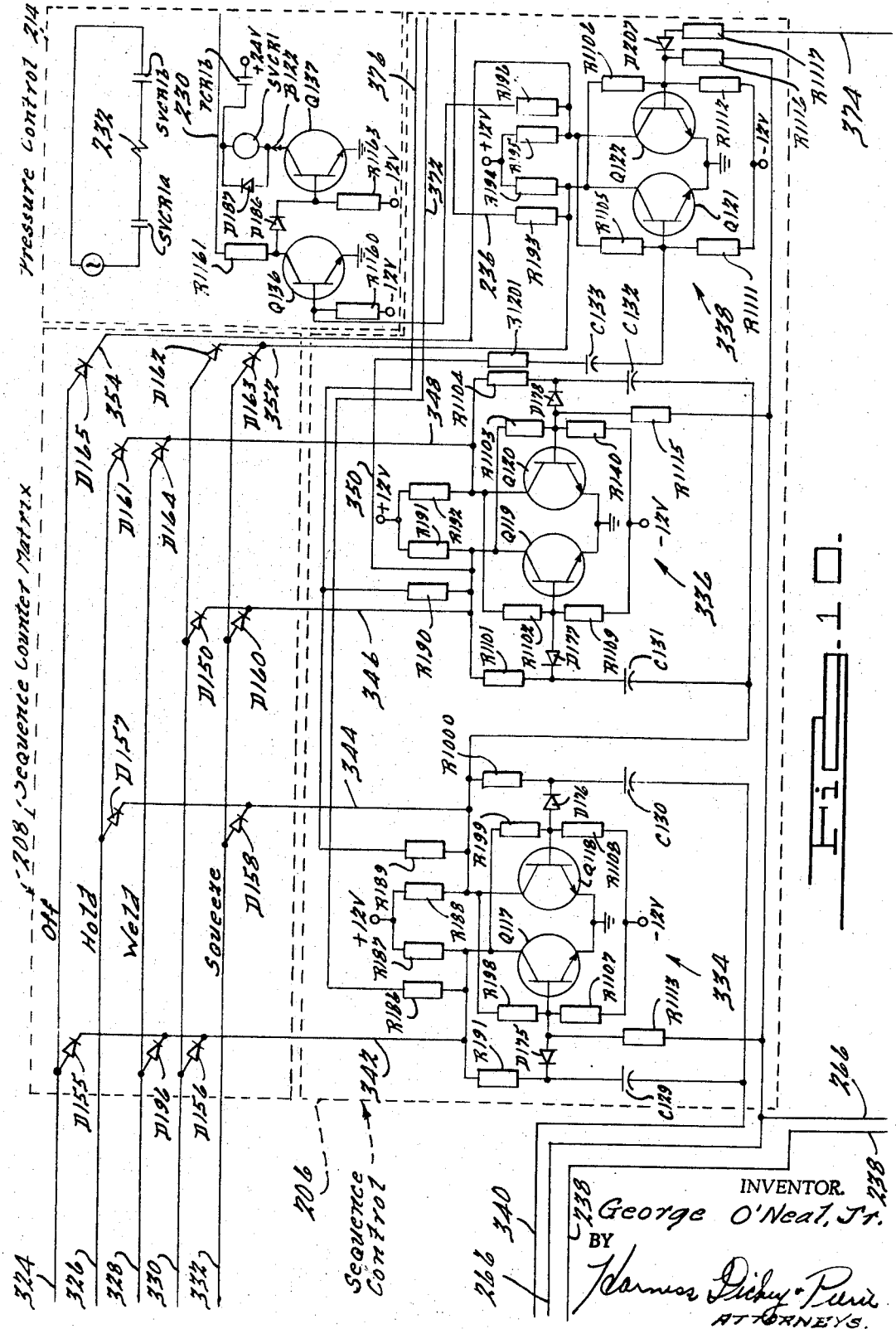
Figure 17:
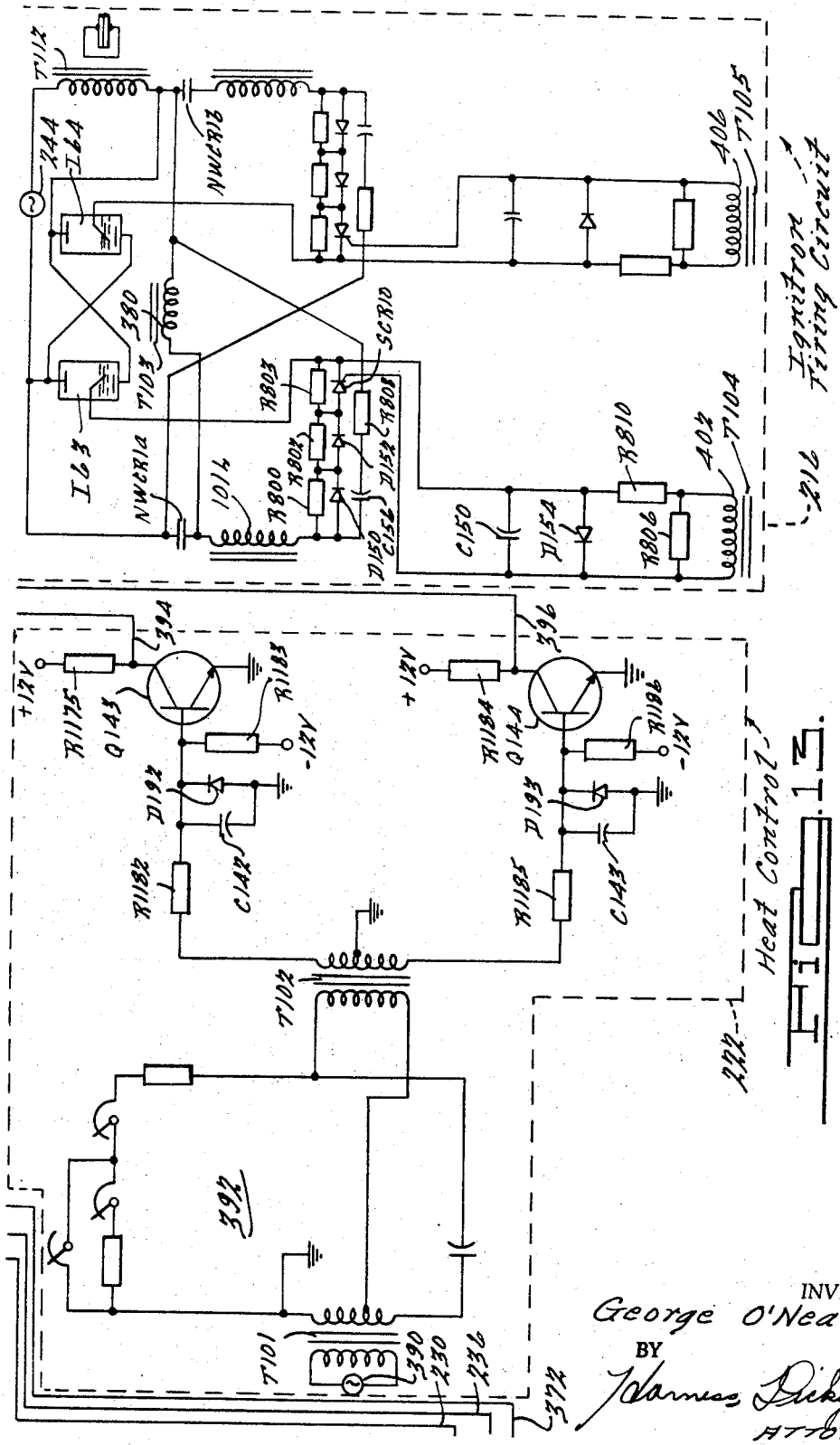

FIGS. 8 through 13 schematically represent another form of an electrical control circuit embodying certain of the principles of the present invention, in which:

FIG. 8 is a schematic representation of a counter circuit and an associated matrix;

FIG. 9 is a schematic representation of a pulse generating and coincidence circuit;

FIG. 10 is a schematic representation of a sequence counter with its matrix and certain pressure control equipment;

FIG. 11 is a schematic representation of certain control circuits for controlling the operation of the system;

FIG. 12 is a schematic representation of a firing delay circuit, a power factor angle detection circuit and a firing pulser; and FIG. 13 is a schematic representation of a heat control circuit and of an ignitron firing circuit.

Figure 6:
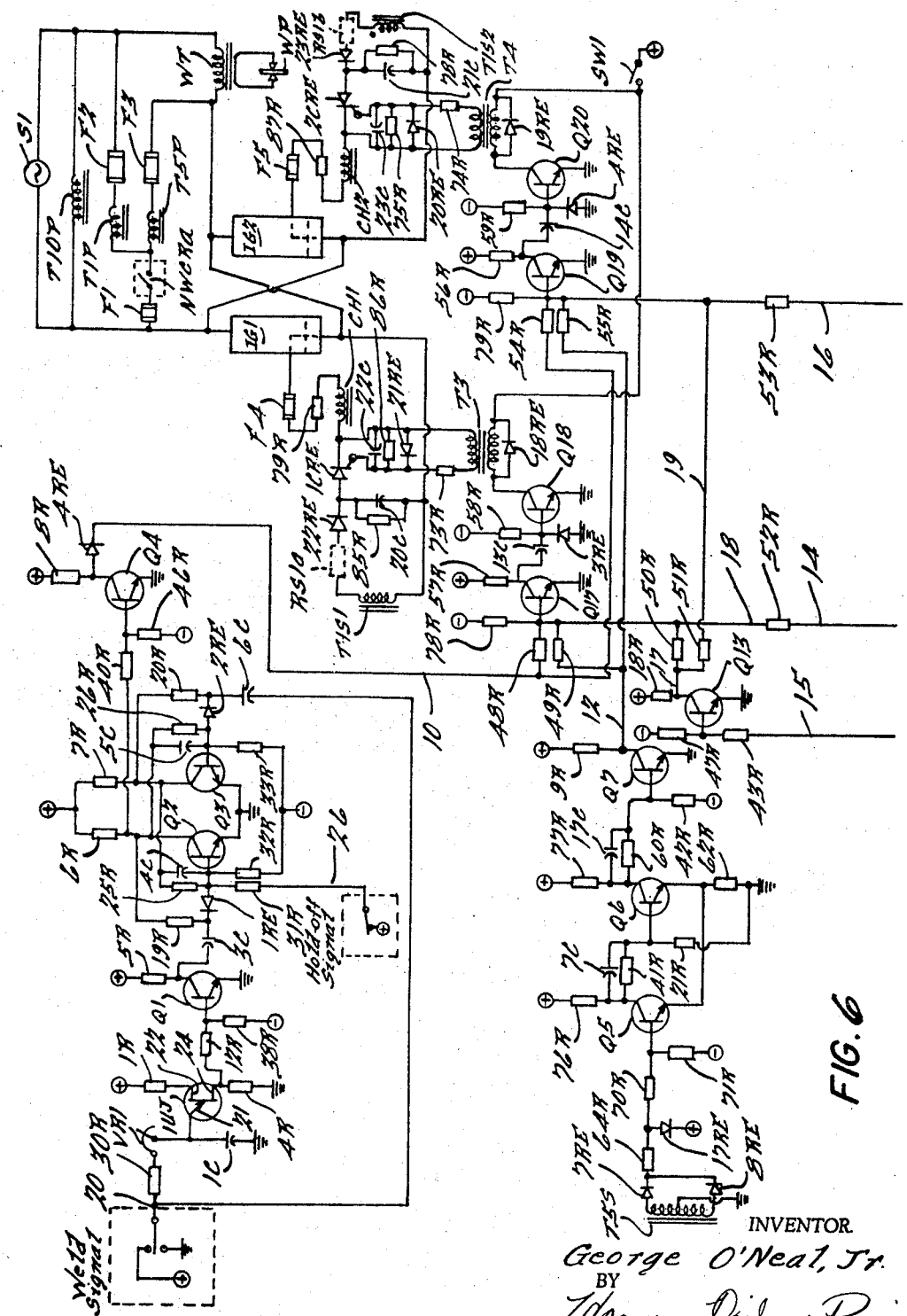
FIG. 6 is a schematic representation of another portion of the circuit, including elements of the firing and output circuits.
Figure 7:
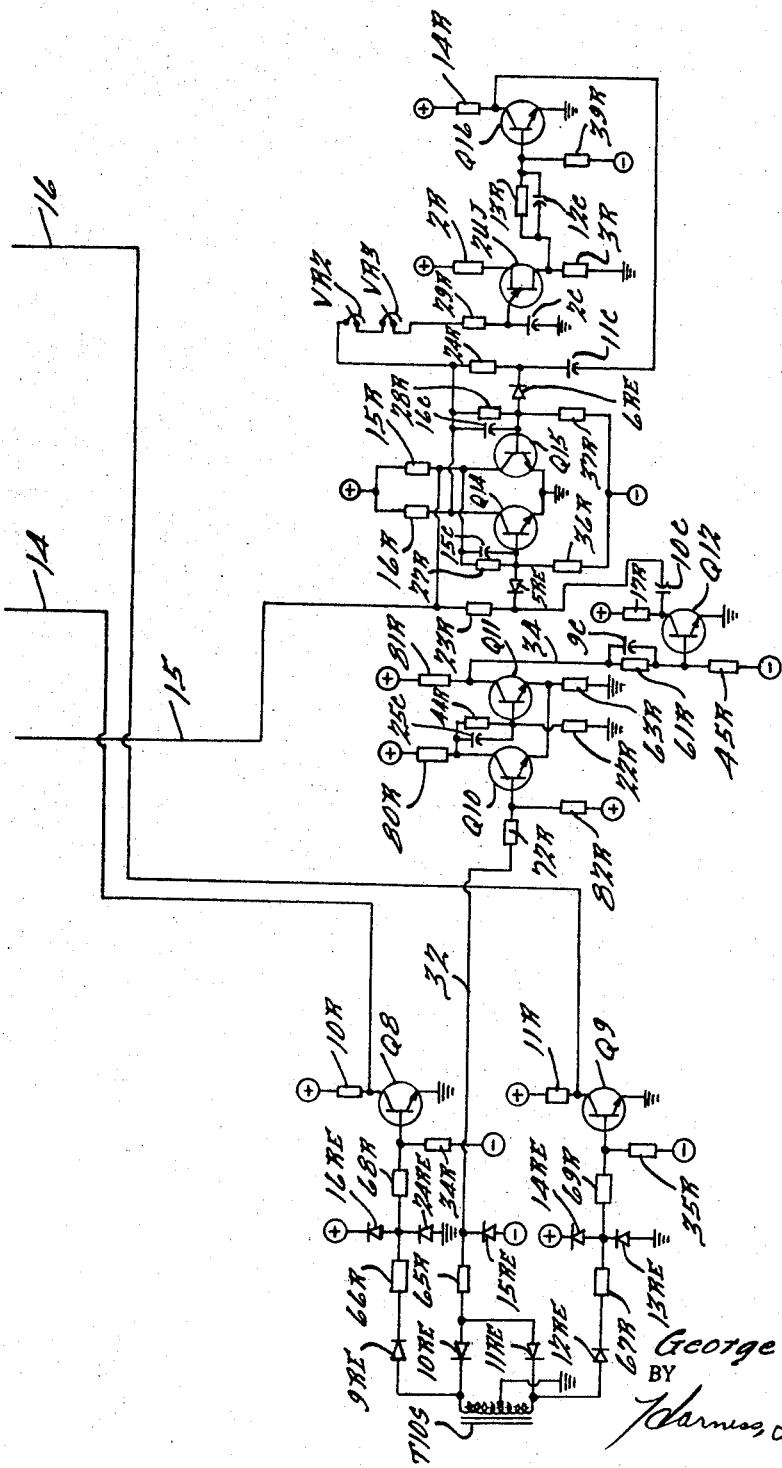
FIG. 7 is a schematic representation of another portion of the circuit of FIG. 6.

For proper orientation, FIG. 2 should be placed below FIG. 1, FIG. 3 should be placed to the right of FIG. 1, FIG. 4 should be placed below FIG. 3, and FIG. 5 should be placed to the right of FIG. 3. FIGS. 6 and 7 may be oriented separately, with FIG. 7 being placed below FIG. 6. For proper orientation of the system disclosed in FIGS. 8 through 13, FIG. 9 should be placed below FIG. 8, FIG. 10 to the right of FIG. 9, FIG. 11 below FIG. 10, FIG. 12 to the right of FIG. 10, and FIG. 13 below FIG. 12.

For convenience of illustration, the transformer windings have been illustrated in the drawings in a way to best show the functions of those transformers and consequently, the primary and secondary windings are, in some cases, shown separated. Common prefix designations have been employed in each such case, however, to permit identification of which secondary windings are associated with which primary windings. Additionally, in the drawings, the sources of direct voltage have been indicated by a circle bearing a sign indicative of the polarity of the source.

It is to be understood that in each case the other terminal of the source is assumed to be connected to ground. For convenience and clarity, voltage values have been referred to in the following description. It is to be understood that they are but representative. Further, in certain of the circuits, particularly those in FIGS. 1 through 5, certain of the elements have been shown symbolically where the nature of the circuitry is well known to the art, and in other cases, certain of the elements which may in commercial practice desirably be more sophisticated have been illustrated in simplified form to facilitate understanding.

Initiation

When it is desired to place the system in operation, the pilot switch PS (FIG. 1) is actuated by the operator to complete an energizing circuit from source 1S to the pilot control relay PCR, relay PCR, in operation, closes its normally open contacts PCRa to complete a circuit from source 1S including rectifier RE1 to hold relay PCR energized despite the release of pilot switch PS, in a manner hereinafter to be described.

Relay PCR, in operating, also closes its normally open contacts PCRe to complete a circuit from source 1S through switch NW to energize relay NWCR. Relay NWCR is a "no weld control" relay which controls, primarily, certain firing-circuit operations hereinafter to be described in connection with FIGS. 6 and 7 of the drawings. Switch NW is a weld-no weld switch which is illustrated in its "weld" position.

Relay PCR, in operating, also closes its normally open contacts PCRb to enable a control circuit hereinafter to be described including the valve 144 which controls the forceful application of the welding electrodes to the work.

Relay PCR, in operating, also opens its normally closed contacts PCRd to disconnect ground from the left hand terminal resistor R7, and closes its normally open contacts PCRc to connect a source of potential through resistors R7 and R8 to capacitor C1, the lower terminal of which is grounded, and hence connected to the opposite terminal of the direct-current source. As a result, the capacitor C1 charges at a rate determined primarily by its value and the values of resistors R7 and R8. These elements constitute a time-delay circuit to allow any contact bounce or chatter in relay PCR to subside.

The upper terminal of capacitor C1 is connected through resistor R9 to the base of transistor 22Q, which is also connected to a source of negative bias through resistor R10. Transistors 22Q and 23Q are interconnected as a bistable multivibrator in a form of Schmitt trigger circuit, with the collector of transistor 22Q being coupled to the base of transistor 23Q via a network comprising capacitor C2 and resistors R11, R12 and R13, and with the interconnected emitters of the two transistors being connected to ground through resistor R14. Prior to the operation of relay PCR, while capacitor C1 is discharged with both of its terminals being effectively at ground potential, transistor 22Q is held in a nonconductive state and transistor 23Q is conducting. When capacitor C1 becomes sufficiently charged, following the operation of relay PCR, transistor 22Q begins to become conductive, and as a result of the coupling between transistors 22Q and 23Q, transistor 22Q rapidly becomes fully conductive and transistor 23Q is rapidly driven to a nonconductive state. Thus, there is a rapid and precise change of state of the multivibrator comprising transistors 22Q and 23Q despite the fact that the input signal (the charge upon capacitor C1) is changing exponentially and but relatively slowly. It will be observed that the multivibrator remains in this state so long as relay PCR remains operated. When relay PCR releases, capacitor C1 is discharged through contacts PCRd with a diode RE3 being connected in shunt of resistor R8 to accelerate the discharge so as rapidly to prepare the system for the next sequence of operations.

At the noted change of state of the time delay unit 41, including transistors 22Q and 23Q, a positive-going signal is applied via conductor 46 to the sequence reset unit 47, which includes transistor 13Q, and to the counter-reset unit 49, which includes transistor 11Q, and a negative-going signal is applied via conductor 48 to the gate circuit 51 including transistor 26Q (FIG. 2), to the weld signal amplifier 53 including transistor 31Q (FIG. 5), and to the lockout circuit 55 including transistor 25Q.

The signal applied to conductor 46 changes from a relatively low potential, approaching ground and hereinafter, for convenience, deemed to be ground, to a higher potential, approaching, for example, 12 volts and hereinafter for simplicity of description deemed to be 12 volts. Conversely, the signal applied to conductor 48 drops from a value approaching and deemed to be 12 volts to a potential approaching and deemed to be ground.

Prior to the application of the positive-going signal to the sequence reset circuit 47 (FIG. 1), transistor 13Q is not conducting so that the voltage at the collector of that transistor, and hence on conductor 26, is effectively the assumed 12 volt potential which is connected to that collector through load resistor R9. That positive potential is denominated the "hold-off" signal and is applied to the firing circuit (FIGS. 6 and 7), to the squeeze-delay and squeeze circuit 57 (FIG. 2), and to the sequence counter 59 (FIG. 3). In each case, that positive potential holds a selected one of a pair of transistors constituting a bistable multivrator conductive, that is, it holds each of the multivibrators in one of its two stable states. In the case of the sequence counter 59 (FIG. 3), this positive potential on conductor 26 holds transistors 14Q and 16Q conductive so that transistors 15Q and 17Q are not conductive.

When the positive-going signal appears on conductor 46, it is applied to the base of transistor 13Q (FIG. 1) via resistors R10 and R11, the latter of which is connected to a source of negative biasing potential. Transistor 13Q conducts with a resultant reduction in its collector potential to the assumed ground level. As a result, the positive potential which was previously applied to conductor 26 and thence to the base of transistor 14Q in the sequence counter 59 via the voltage divider network comprising resistors R12 and R13 (the former of which is smaller than the latter) is relieved. Further, since capacitor C3 was previously charged with its lower electrode positive relative to its upper electrode during the period in which conductor 26 was at its 12 volt potential, the abrupt reduction of the potential on conductor 26 produces a negative pulse which is applied throgh rectifier RE4 to the base of transistor 14Q. Transistor 14Q is rendered non-conductive. Transistors 14Q and 15Q are coupled as a bistable multivibrator, with the collector of transistor 14Q being connected to the base of transistor 15Q via a network including load resistor R14, resistor R15 shunted by capacitor C4, and biasing resistor R16, and with the collector of transistor 15Q being coupled to the base of transistor 14Q by a similar network including elements R17, R18, R13 and C5. As a result, transistor 15Q is rendered conductive. In a similar fashion, the reduction in potential on conductor 26 causes transistor 16Q to be rendered non-conductive and transistor 17Q, which is coupled with transistor 16Q as another bistable multivibrator, to be rendered conductive. In a manner to be described hereinafter, this change of state of the two multivibrators comprising transistors 15Q through 17Q produces an output signal through a matrix indicative of a first interval among a plurality of intervals constituting a weld cycle, that first interval herein being termed the "squeeze" interval.

The termination of the positive "hold-off" signal on conductor 26 also enables the firing circuit (FIGS. 6 and 7) to function, in a manner to be described hereinafter.

Figure 2:
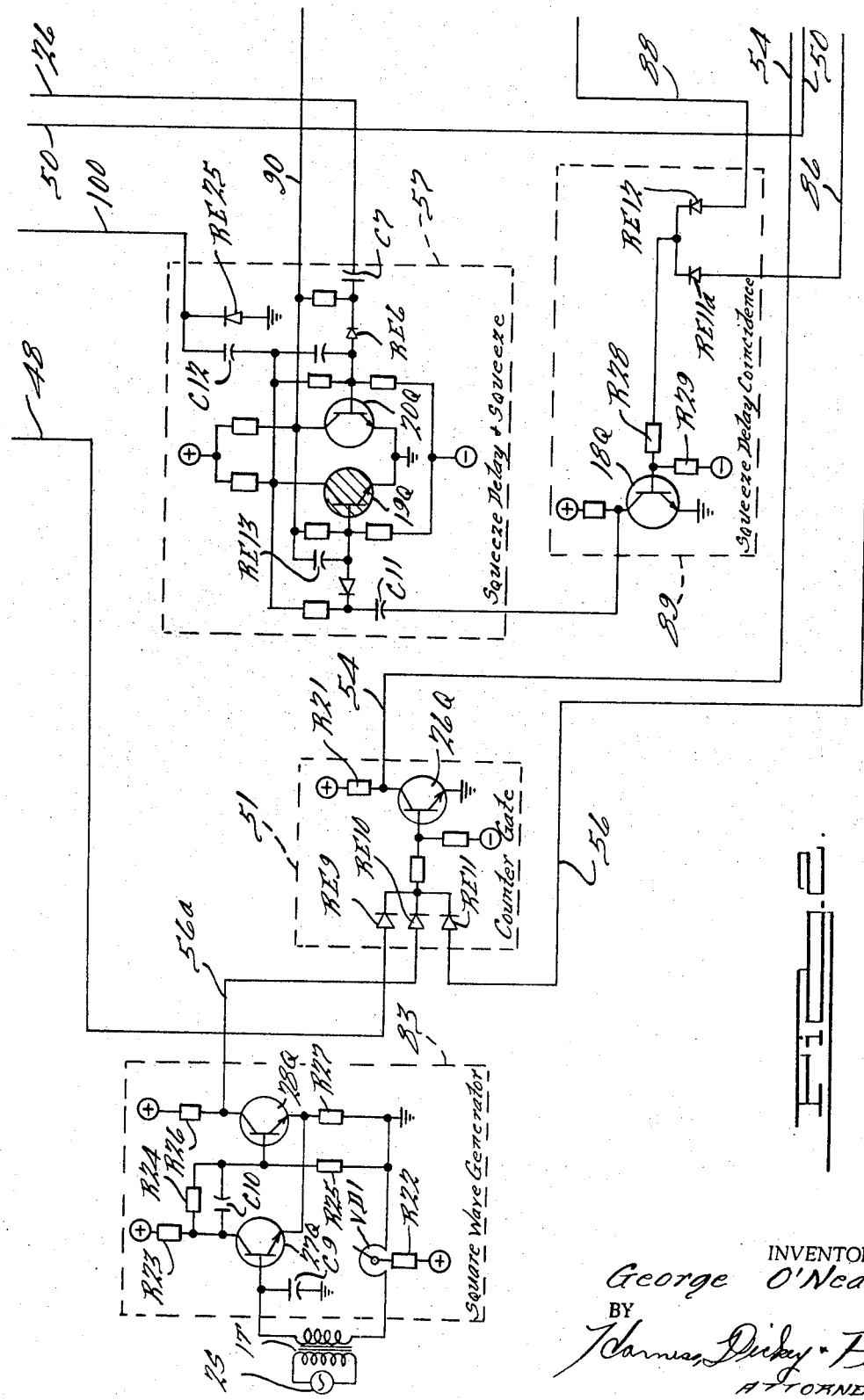
FIG. 2 is a schematic representation of another portion of the circuit, including square wave generating, gate, squeeze-delay and squeeze, and squeeze delay coincidence elements.
Figure 3:
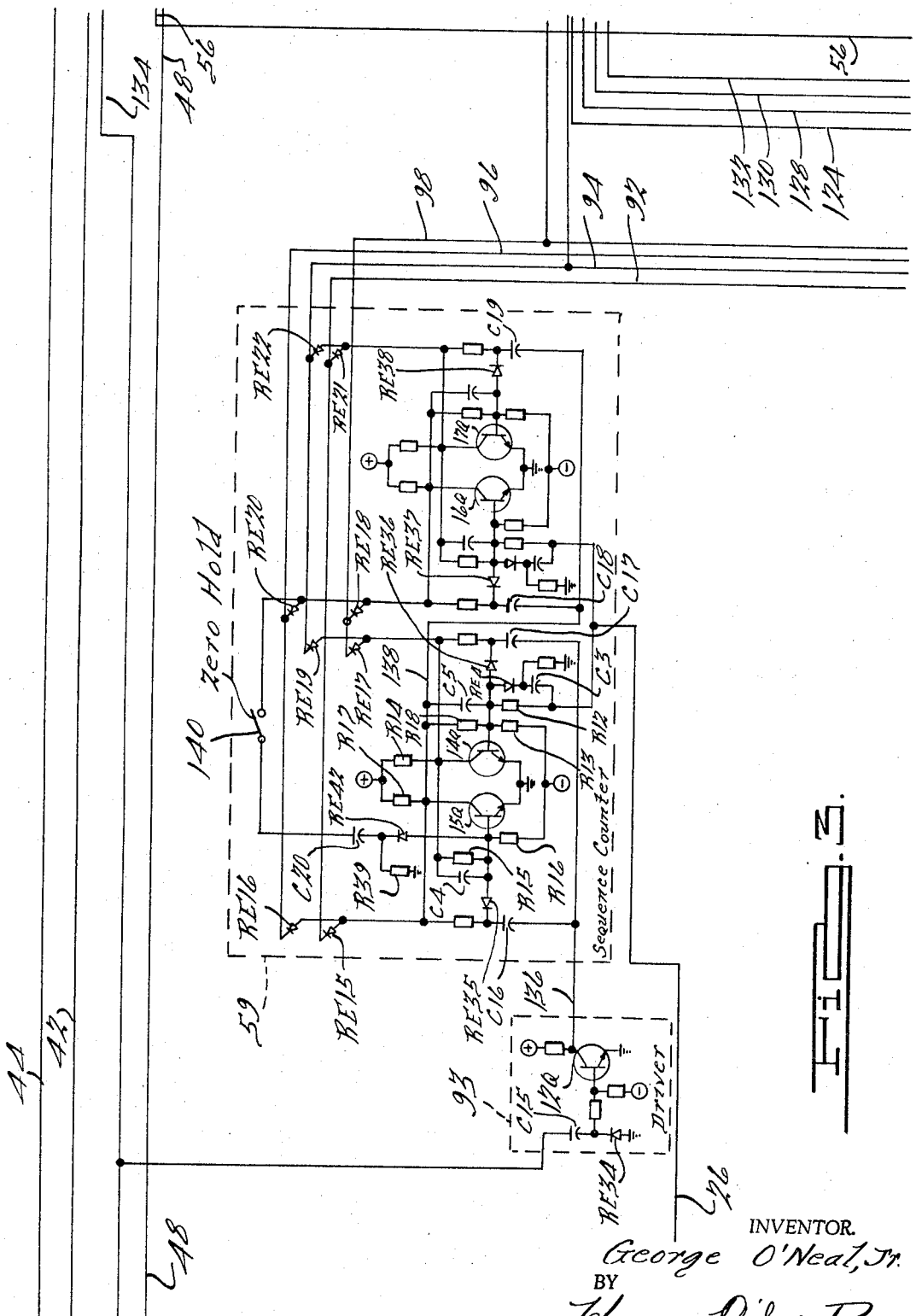
FIG. 3 is a schematic representation of another portion of the circuit, including driver and sequence counter-elements.

The same hold-off signal appearing on conductor 26 is applied to the squeeze-delay circuit 57 (FIG. 2). During the hold-off period, in which conductor 26 is at its positive potential, capacitor C7 (FIG. 2) is charged to a small potential, with its right-hand electrode positive relative to its left-hand electrode. When the potential on conductors 26 drops to the assumed ground level, a negative pulse is applied via capacitor C7 through rectifier RE6 to the base of transistor 20Q to establish or confirm that the bistable multivibrator comprising transistors 19Q and 20Q is in its illustrated stable state, with transistor 19Q conducting and transistor 20Q not conducting. In this stable state, the squeeze-delay unit serves, as will be seen, to delay the initiation of the squeeze interval even though the system is prepared to time the squeeze interval by virtue of the previously described actuation of transistors 15Q and 17Q (FIG. 3).

Figure 1:
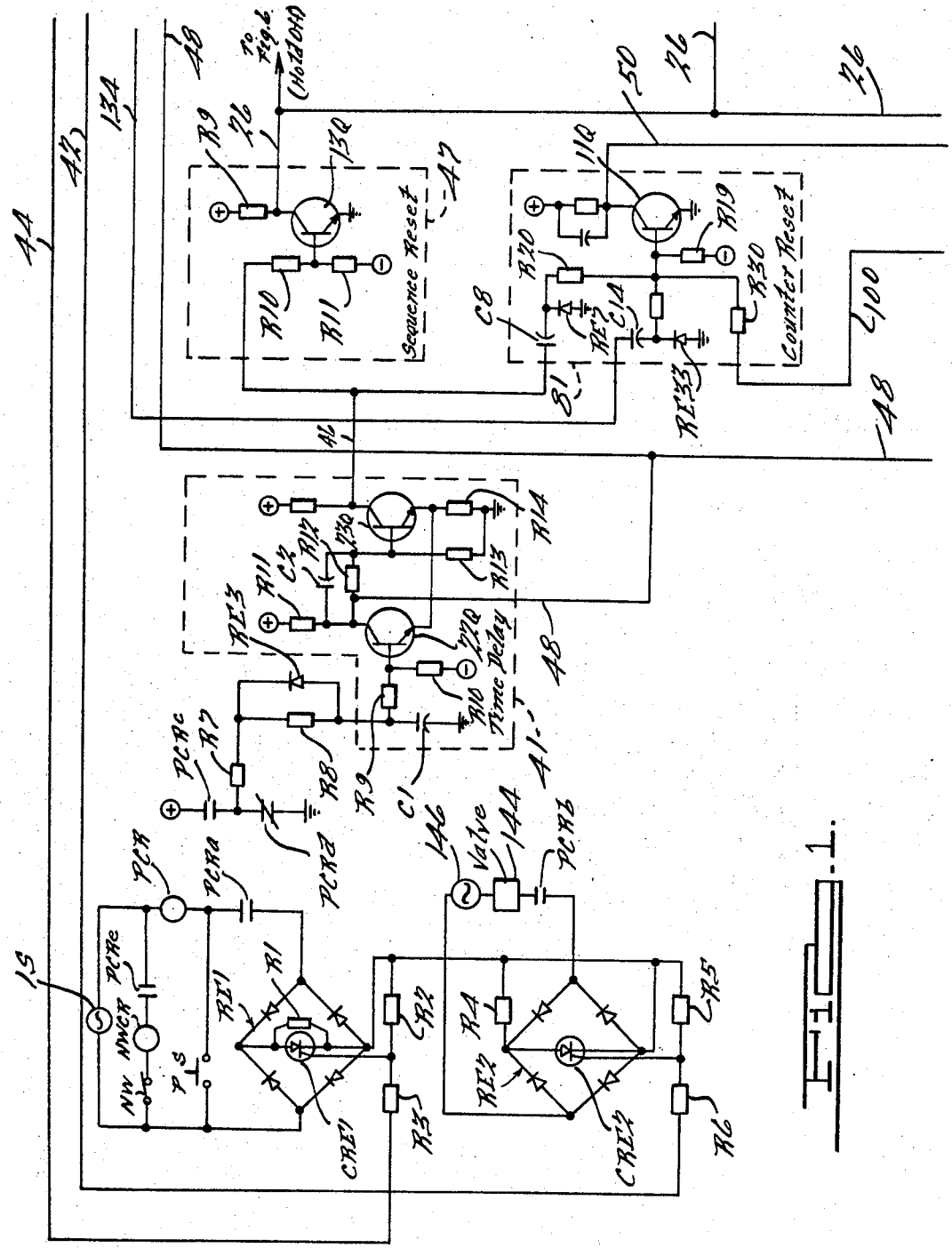
FIGURE 1 is a schematic representation of a portion of an electrical control circuit embodying certain of the principles of the present invention including control, time delay, sequence reset and counter-reset elements.

In addition to the application of the positive-going signal on conductor 46 to the sequence reset circuit 47 (FIG. 1), as above described, that signal is also applied to the counter reset circuit 81 which includes transistor 11Q (FIG. 1). Transistor 11Q is normally biased to a nonconductive state by the application to the base thereof of a negative potential through biasing resistor R19. A negative potential is applied from the same source through resistor R20 to the right-hand electrode of capacitor C8, but that electrode is held essentially at ground potential by rectifier RE7. Therefore, when conductor 46 is at ground potential, capacitor C8 is discharged. When the time-delay transistor 23Q is rendered non-conductive, to apply a positive potential to conductor 46, an abrupt positive-going pulse is applied via capacitor C8 and resistor R20 to the base of transistor 11Q to render that transistor conductive. As a result, the potential at the collector of transistor 11Q drops abruptly to the assumed ground potential. Capacitor C8 immediately commences to charge and the charge is at a relatively rapid rate (in a representative arrangement, the product of the capacitance of capacitor C8 and the resistance of resistor R20 was 33 micro seconds). As capacitor C8 charges, the potential applied to the base of transistor 11Q falls exponentially to reduce the conductivity of transistor 11Q accordingly, to the point at which transistor 11Q is cut off. As a result, the potential at the collector of transistor 11Q, which is applied to conductor 50, is a short duration negative-going pulse with a steep leading edge. Once capacitor C8 is charged, transistor 11Q remains in its non-conductive state until the potential on conductor 46 reverts to ground level. At that time, capacitor C8 rapidly discharges through rectifier RE7.

Figure 4:
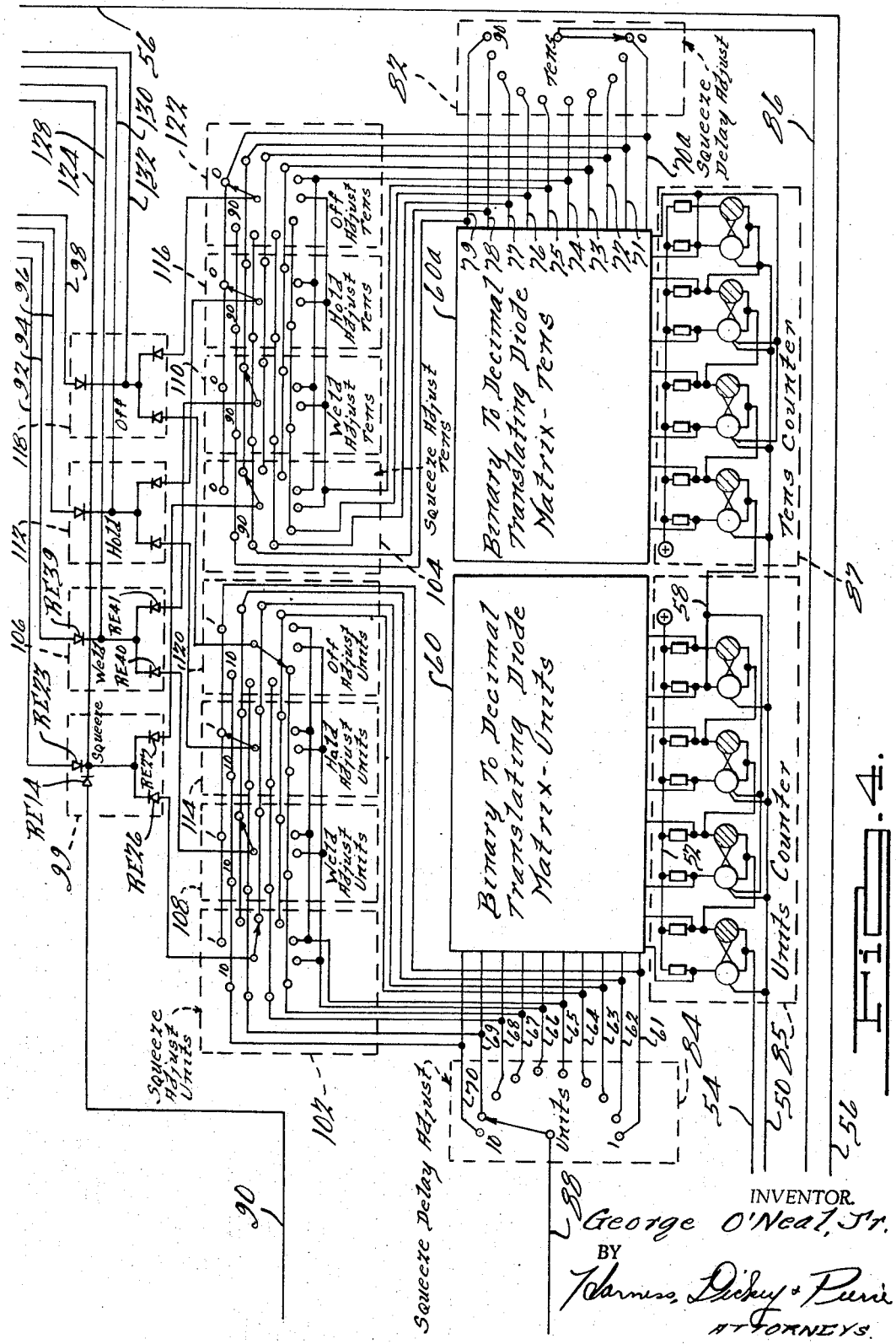
FIG. 4 is a schematic representation of another portion of the circuit, including time adjust, coincidence and counter elements.

This negative-going pulse on conductor 50 is applied to the units counter 85 and the tens counter 87 shown in FIG. 4 of the drawings. These counters are conventional and hence each has been illustrated in a form symbolic of a four-stage binary counter modified, as will be noted, into a ten-count unit. Each comprises a chain of four bistable multivibrators. The counters are desirably transistorized. As such, each multivibrator may comprise a pair of transistors cross coupled to operate as a bistable multivibrator similar in type to the bistable multivibrator including transistors 13Q and 14Q (FIG. 2) previously described. As an example, each of the bistable multivibrators in the units counter 85 (FIG. 4) may comprise a pair of transistors the collector of each of which is connected to a source of positive potential on conductor 52 and the emitters of which are grounded. The bases may be connected to a suitable source of negative biasing potential and the two transistors should be cross coupled to operate as a type of bistable multivibrator circuit. In the preferred arrangement all input signals, including the reset signal on conductor 50 and the "clocking" signals on conductor 54 (to be described), are capacitively coupled to the bases through individual isolation networks, the reset signal on conductor 50 being applied to the bases of the left-hand one of each of the pairs of transistors in both counters and the "clocking" signals being applied to the bases of both transistors in each pair.

When the negative-going pulse appears on conductor 50, it is applied to the left-hand elements of each of the bistable multivibrators in both counters to trigger both counters to the state in which they are illustrated with the right-hand transistor in each pair being conductive.

It will be recalled that at the end of the time-delay, transistor 22Q (FIG. 1) is rendered conductive, producing a reduction in the potential on conductor 48 from a value approaching 12 volts to a value approaching ground. This signal is applied to rectifier RE9 (FIG. 2) in the counter-gate circuit 51. When the potential upon conductor 48 is positive, a positive potential is applied via rectifier RE9 to the base of transistor 26Q to render that transistor conductive so that the output potential upon conductor 54, connected to its collector, is essentially at ground potential due to the potential drop across load resistor R21. However, when the potential on conductor 48 drops essentially to ground, the application of the positive potential via rectifier RE9 to the base of transistor 26Q is terminated so that transistor 26Q is no longer inhibited to become non-conductive, that is, it is, as far as this control is concerned, enabled or in condition to respond to other input signals applied to the base thereof via rectifier RE10, as will be described. There is another inhibit signal which is capable of being applied to transistor 26Q. This signal is applied via conductor 56 and rectifier RE11, but, as will be seen, it is effective to inhibit or prevent transistor 26Q from following the input signals applied thereto via rectifier RE10 only if repeat-nonrepeat switch 142 (FIG. 5) is set to its non-repeat position, and only then if the system is in "off" time. It will be assumed, for present purposes, that conductor 56 is open circuited at this juncture so that no inhibit signal is applied to transistor 26Q via rectifier RE11. Accordingly, transistor 26Q is in condition to respond to input signals applied thereto via rectifier RE10.

*Counting pulse generation*

These signals are produced by the square wave generator 83 (FIG. 2). Square wave generator 83 is energized from an alternating current source 2S (FIG. 2) which is desirably the same as or in phase with the source S1 (FIG. 6) which energizes the welding transformer. Source 2S is coupled to generator 83 by transformer 1T, the lower terminal of the secondary winding of which is connected to ground through the resistive element of a variable voltage divider VD1, the wiper of which is connected through resistor R22 to a source of positive biasing potential. The upper terminal of the secondary winding of transformer 1T is connected to the base of transistor 27Q. Capacitor C9 is connected to the base of transistor 27Q and serves to reduce the effect of any transients or "hash" on the line. The collector of transistor 27Q is connected to a source of suitable positive potential through load resistor R23. The output of transistor 27Q is coupled to the base of transistor 28Q via a network comprising capacitor C10, resistor R24 and base resistor R25. The collector of transistor 28Q is connected to a source of positive potential through load resistor R26 and the emitter is connected to ground through resistor R27. The potential at the emitter of transistor 28Q is applied to the emitter of transistor 27Q, that is, there is regenerative emitter coupling to produce a snap-action of the pair of transistors 27Q–28Q. As a result, when the base of transistor 27Q is at or above a preselected critical value, transistor 27Q becomes conductive, which tends to render transistor 28Q non-conductive, and the action is regenerative to cause transistor 27Q abruptly to become fully conductive and transistor 28Q abruptly to become non-conductive. Conversely, when the potential at the base of transistor 27Q drops below a preselected value, the conductivity of transistor 27Q is reduced, which increases the conductivity through transistor 28Q and the action is again regenerative, driving transistor 27Q non-conductive and causing transistor 28Q to become fully conductive. As a result, the combination of transistors 27Q and 28Q produces at conductor 56a, which is connected to the collector of transistor 28Q, an accurate square wave signal even though the input to transistor 27Q is a sinusoidal wave.

The purpose of voltage divider VD1 is to cause the abrupt transition of the conductivities of transistors 27Q and 28Q to occur at the desired preselected point on the sinusoidal wave form of the source 2S. In the preferred practice, this transition occurs precisely at the zero degree point on the wave form, that is, voltage divider VD1 is set to the value which will cause resistor 27Q to become abruptly conductive, and transistor 28Q to become abruptly non-conductive, at the point at which the alternating current wave form rises, in its negative half cycle as applied to the base of transistor 27Q, to zero volts. At this point, the voltage on conductor 56a will abruptly change in a positive direction. The return of the potential on conductor 56a to its lower value, may not occur precisely at the 180° point, but as will be seen, it is the leading edge of the square-wave form which is utilized to produce a result, and the illustrated square-wave generator is particularly well adapted to produce accurate synchronism with the line at the leading edge of the square-wave form. In the illustrated arrangement, therefore, since the square-wave generator is shown to be directly connected to source 2S, there is continuously applied to conductor 56a a square-wave signal the positive-going edge of which is accurately synchronized with the line.

While voltage divider VD1 may be adjusted to provide for triggering of the transistors 27Q–28Q at a point other than the zero-degree point on the applied sine wave, so as to change the point of synchronism with the line, there are substantial advantages in employing zero-degree point. In the first place, transients are normally present upon the line and can induce signals which are improperly counted by the counter. By utilizing the zero-degree point on the sine wave as the actuating signal for the square-wave generator, the effect of these transients can be majorly obviated. Secondly, if a point on the sine wave separated from the zero-degree point is employed as the triggering signal, that is, if the alternating current instantaneous voltage at which triggering is selected to occur is other than zero, then changes in the amplitude of the line voltage can produce at least minor shifts in the phase of the reference point. The selection of the zero-degree point as the reference point obviates the tendency for a change of the amplitude of the line voltage to produce a phase shift of the reference point since the time at which the zero-degree point occurs is not influenced by any change in amplitude of the line voltage.

*Counting*

The square-wave signal on conductor 56a is applied through rectifier RE10 to the base of transistor 26Q and is capable of producing corresponding changes of the conductivity of that transistor providing the transistor is enabled to operate in response thereto by the application of suitable potentials (or the absence of potentials) to rectifiers RE9 and RE11 as above described. With the counter gate enabled to operate, at the leading, positive-going edge of the square-wave form on conductor 56a transistor 26Q will be rendered conductive to produce an abrupt decrease in the potential applied to conductor 54, and conversely, when the potential of conductor 56a falls, transistor 26Q be rendered effectively non-conductive to abruptly increase the potential on conductor 54. The resultant inverted square-wave signal on conductor 54 is applied to the first stage of the units counter 85 (FIG. 4).

At the leading edge of the square-wave applied to conductor 54, the bistable multivibrator which constitutes the first stage of the units counter is triggered to stability with its left hand transistor conductive and its right hand transistor non-conductive. No change of state is produced by the trailing, positive-going edge of the incoming square-wave on conductor 54, but at the next negative-going edge of the square-wave on conductor 54 the first stage of the unit counter 85 is triggered to its initial state which produces an output positive-going pulse which is applied to the second stage of the units counter to change its state so that the left hand transistor thereof is conductive and the right hand transistor thereof is cut off. In a similar fashion (assuming the counter to continue operating), the state of the first stage of the units counter is alternated at each negative-going edge of the square wave pulse on conductor 54, the second stage of the units counter is changed in state at each alternate change in state of the first stage, the state of the third stage is changed at each alternate change of state of the second stage and the state of the fourth stage is changed at each alternate change of state of the third stage. However, the four-stage binary counter which is illustrated as the units counter 85 would normally count to sixteen before recycling. Since it is desired to utilize a decimal basis in certain subsequent operations, the fourth stage of the units counter is coupled back to the second and third stages so that in response to the change of state of the fourth stage, the states of the second and third stages are immediately caused to reverse. Thus, upon the count of eight, the units counter is immediately and automatically set to a count equivalent to 14. On the 9th pulse, the units counter is effectively set to a state equivalent to a count of 15 and on the 10th pulse, the units counter is effectively set to a state equivalent to the 16th count, which is the reset condition preliminary to the resumption of the state established by the "one" count.

At this reset condition, in which each of the four stages of the units counter 85 is set with its right-hand transistor conductive, as illustrated, the fourth stage produces a positive-going output pulse which is applied via conductor 58 to the first stage of the tens counter 87 to cause that tens counter to step to its first count. Similarly, each ten incoming pulses on conductor 54 causes a corresponding output pulse on conductor 58 which will step the tens counter one additional count. In a manner similar to that previously described, the fourth stage of the tens counter is coupled to the second and third stages of that counter to again convert the tens counter to a basis such that ten incoming pulses will cause it to restore to its initial condition.

*Translation*

Associated with the units counter 85 is a binary-to-decimal translating matrix 60, and a similar matrix 60a is associated with the tens counter 87. These matrices, which are conventional, translate the modified binary indication from the counters 85 and 87 into a decimal output. Thus, the units counter 85, operating through the matrix 60, grounds conductor 61 during its initial state, and grounds conductors 62 through 70, respectively, in response to the first through the ninth clocking pulses applied thereto via conductor 54, respectively. Similarly the tens counter 87, operating through the matrix 60a, grounds conductor 70a in its initial condition, representing zero tens, and grounds conductors 71 through 79, respectively, in response to the first to the ninth input pulses to the tens counter. In each case, the other conductors are at a positive potential, such as 12 volts.

*Squeeze delay*

As before indicated, counters 85 and 87 are initially counting squeeze-delay time. The magnitude of that delay is selected by the "tens" and "units" squeeze-delay adjust switches 82 and 84. These are illustratively shown to be set upon the "zero" and "9" terminals, respectively. As a result, from the commencement of counting, output conductor 86, which is connected to the movable element of the "tens" squeeze-delay adjust switch 82, is at ground potential. Output conductor 88, connected to the movable element of the "units" squeeze-delay adjust switch 84, attains ground potential in response to the 8th input pulse on conductor 54. If either conductor 86 or conductor 88 is at its positive potential, that positive potential is applied via rectifier RE11a or RE12, respectively, in the squeeze-delay coincidence circuit 89 (FIG. 2) and via resistive network R28 and R29 to the base of transistor 18Q to render that transistor conductive. At one pulse on conductor 54 less than the selected count, both conductors 86 and 88 are at their ground potential and as a result, transistor 18Q is biased off by the source of negative potential applied to the base thereof through transistor 29. As a result, the collector of transistor 18Q goes positive, tending to produce a positive pulse via capacitor C11 to the base of transistor 19Q in the squeeze-delay circuit 57. However, any such positive pulse is blocked by rectifier RE13 so that no such positive pulse can change the state of the bistable multivibrator comprising transistors 19Q and 20Q. Thus, with the "units" squeeze adjust switch 84 set to the No. 9 position, coincidence is reached at the 8th pulse on conductor 54, which produces a change of state of transistor 18Q, but this change of state is ineffective to produce any change of state of the squeeze delay and squeeze multivibrator circuit 57. However, at the 9th pulse on conductor 54, the potential on conductor 88 again rises to the approximately 12 volt value, to terminate coincidence. The positive potential on conductor 88 is applied through rectifier RE12 to the base of transistor 18Q to render that transistor conductive and to produce a resultant abrupt drop in the potential at the collector thereof. This results in the application via capacitor C7 of a negative going pulse to the base of transistor 19Q through rectifier RE13. This signal changes the state of the bistable multivibrator including transistors 19Q and 20Q by rendering transistor 19Q non-conductive and rendering transistor 20Q conductive.

By arranging the circuitry so that coincidence is met one pulse in advance of the selected count but so that the output signal indicative of the existence of the preselected count does not occur until the preselected count has in fact been achieved, race problems which would otherwise occur, particularly if all or several of the functions were set to minimum count, are avoided.

The change of state of the bistable multivibrator comprising transistors 19Q and 20Q signals the end of the squeeze-delay interval period. During that interval, the collector of transistor 20Q is positive and the collector of transistor 19Q is approximately at ground potential. Consequently, at the change of state of that bistable multivibrator, the potential on conductor 90, which is applied to rectifier RE14 in the "squeeze" coincidence circuit 99 in FIG. 4, changes from a substantial positive value to a value approaching ground. It is the presence of the positive potential on conductor 90 during the squeeze-delay interval which inhibits the squeeze coincidence circuit including rectifier RE14, and thereby prevents the "squeeze" operation from occurring, and the reduction in the potential on conductor 90 to ground level which constitutes a termination of that inhibition.

It will be recalled that at the termination of the time-delay interval established by unit 41 (FIG. 1), the sequence reset unit 47 transmitted a signal via conductor 26 to set the sequence counter 59 (FIG. 3) in a state in which transistors 15Q and 17Q are conducting, and transistors 14Q and 16Q are not conducting. This is the "squeeze" state of the sequence counter. Associated with the sequence counter is a diode matrix, the inputs of which are connected to the collectors of the four transistors 14Q–17Q. This diode matrix controls the potentials which are applied to its output conductors 92, 94, 96 and 98 in accordance with the instant state of the two multivibrators in the sequence counter. Each of these conductors may be at one of two potentials, a potential approaching 12 volts and a potential approaching ground. But one of the four conductors is at ground potential at any given time, and it is this ground potential which is the signal which enables the performance of the selected function.

During the "squeeze" state of the sequence counter 59 in which transistors 15Q and 17Q are conductive, ground potential is applied to rectifiers RE15, RE16, RE21 and RE22, whereas all of the other rectifiers in the sequence counter matrix have a positive potential applied thereto. Of the four output conductors 92–98, only conductor 92, therefore, is at ground potential. This ground potential on conductor 22 is applied to rectifier RE23 to remove an inhibition upon the squeeze coincidence circuit 99 so as to enable that coincidence circuit, so far as this inhibition is concerned, to produce an output pulse whenever the squeeze interval has expired. However, if there is a squeeze-delay interval selected, coincidence circuit 99 will not produce an output indication even though the inhibition at rectifier RE23 is relieved and even though the counters 85 and 87 reach the count selected by the squeeze adjust switches 102 and 104 because of the effectiveness of the squeeze-delay inhibition applied to rectifier RE14, as above described.

It will be recalled that during the squeeze-delay interval, the bistable multivibrator including transistors 19Q and 20Q (FIG. 2) is in the state in which transistor 19Q is conducting, with its collector essentially at ground potential. This voltage is applied to the lower electrode of capacitor C12, the upper electrode of which is connected via conductor 100 and resistor R30 (FIG. 1) to the base of transistor 11Q which is at a negative potential. However, diode RE25 (FIG. 2) prevents the upper electrode of capacitor C12 from becoming more negative than ground so that capacitor C12 is essentially discharged during this period. The bistable multivibrator including transistors 19Q and 20Q changes state at the end of the squeeze-delay interval, and the collector of transistor 19Q rapidly rises in potential causing capacitor C12 to apply a positive pulse to the base of transistor 11Q (FIG. 1) to render that transistor conductive. In a manner similar to that previously described, capacitor C12 then charges at a relatively rapid rate to correspondingly reduce the conductivity of transistor 11Q to the point of nonconductivity, so that transistor 11Q applies to conductor 50, at this point, a negative-going short duration pulse. This pulse on conductor 50 is again a reset signal which is applied to all stages of the units and tens counters 85 and 87 (FIG. 4) to reset both counters to their initial state following the completion of the squeeze-delay interval and in preparation for the counting of the squeeze interval.

The squeeze coincidence circuit 99 (FIG. 4) is associated with the units and tens counters 85 and 87 through a units squeeze adjust switch 102 and a tens squeeze adjust switch 104, respectively, the weld coincidence circuit 106 is associated with the units and tens counters 85 and 87 through the units weld adjust switch 108 and the tens weld adjust switch 110, respectively, the hold coincidence circuit 112 is associated with the units and tens counters by means of the units hold adjust switch 114 and the tens hold adjust switch 116, respectively, and the "off" coincidence circuit 118 is associated with the units and tens counters by means of the units "off" adjusting switch 120 and the tens "off" adjust switch 122, respectively.

*Squeeze*

In the illustrated arrangement, the squeeze adjust tens and units switches are shown to be set to establish a squeeze interval of 13 counts. At the third pulse on conductor 54, ground is applied from the units-counter matrix 60 to conductor 63 and hence is applied through the units squeeze adjust switch 102 to rectifier RE26 in the squeeze coincidence circuit 99. However, rectifier RE27 is at this time biased in a forward direction due to the positive potential applied thereto through the squeeze adjust tens switch 104 so the system is ineffective to respond to that third pulse. At the eighth pulse on conductor 54, the conductor 69 becomes effectively grounded, as previously described, which results in the application of that potential through the squeeze delay adjust switch 84 and conductor 88 to rectifier RE12 (FIG. 2) in the squeeze delay coincidence circuit 89. As a result, transistor 18Q is rendered non-conductive, but no positive pulse can be applied via capacitor C11 to the base of transistor 19Q in view of the presence of rectifier RE13, as above described. At the ninth count on conductor 54, conductor 88 returns to its positive potential which renders transistor 18Q conductive. As before, a negative pulse is applied via capacitor C11 and rectifier R13 to the base of transistor 19Q. However, transistor 19Q is already non-conductive so that this pulse produces no change in the state of the squeeze delay circuit 57. It will be noted that during any subsequent intervals in the sequence, including the hold interval and the "off" interval, in which the count is set greater than the squeeze delay, a similar transmission of pulses will occur, but the squeeze delay unit 57 will remain in its second stable state, with transistor 20Q conducting, until it is reset by the sequence reset circuit (FIG. 1) which applies a reset signal thereto via conductor 26, as previously described. This reset signal arrives at the initiation of a new cycle unless the system is in the repeat mode of operation.

At the twelfth pulse on conductor 54, conductor 63 becomes grounded by the units counter and conductor 71 is grounded by the tens counter. These potentials are communicated through switches 102 and 104 to rectifiers RE26 and RE27. Therefore, at this instant, all four of the rectifiers in the squeeze coincidence circuit 99 are biased by signals effectively at ground potential.

The output from the squeeze coincidence gate 99 is applied to the sequence gate 126 (FIG. 5) via conductor 124. Similarly, the weld coincidence circuit 106, the hold coincidence circuit 112 and the off coincidence circuit 118 are connected to sequence gate 126 via conductors 128, 130 and 132, respectively. During the squeeze interval, each of the conductors 128, 130 and 132 is at a substantial positive potential, whereas conductor 124 is approximately at ground potential (actually at a slightly negative potential due to the forward drop across rectifiers RE26 and RE27).

Figure 5:
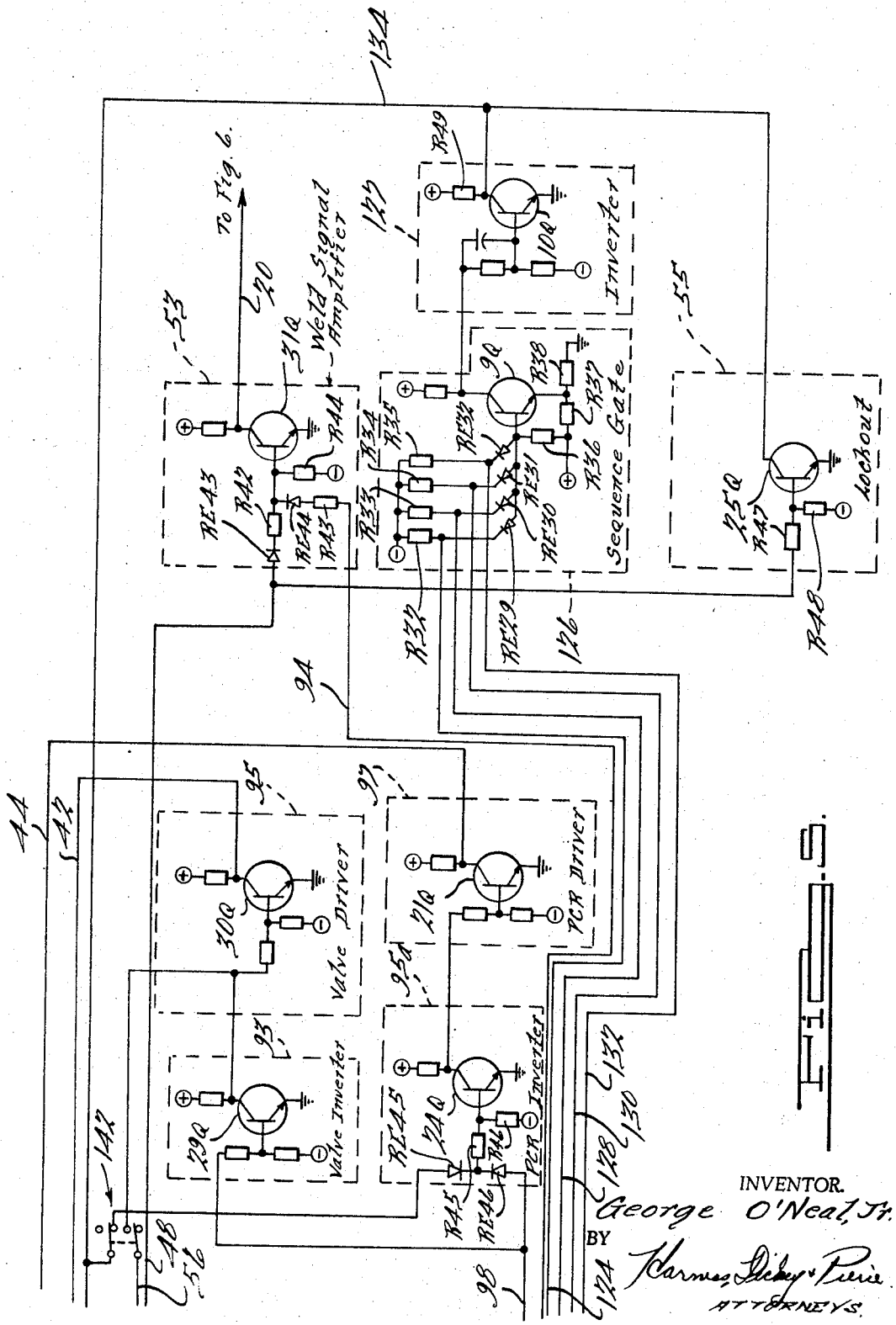
FIG. 5 is a schematic representation of another portion of the circuit, including inverter, driver, amplifier, gate and lockout elements.

Conductor 124 is connected to the junction of resistor R32 and rectifier RE29 in the sequence gate 126 (FIG. 5). Similarly, conductor 128 is connected to the junction of resistor R33 and rectifier RE30, conductor 130 is connected to the junction of resistor R34 and rectifier RE31 and conductor 132 is connected to the junction of resistor R35 and rectifier RE32. The other terminals of resistors R32 through R35 are connected to a source of negative potential and the other terminals of rectifiers RE29 to R32 are connected to the base of transistor 9Q, that base also being connected to a source of positive potential through resistor R36. The emitter of transistor 9Q is biased slightly positive by a voltage divider comprising resistors R37 and R38 connected between a source of positive potential and ground.

When all four of the conductors 124, 128, 130 and 132 are at a positive potential, the base of transistor 9Q is biased positive via resistor R36 so that transistor 9Q is conductive. At any time that any one of the conductors 124, 128, 130 and 132 drops to its lower-potential value, the junction of the corresponding rectifier RE29–RE32, and resistor R32–R35 becomes slightly negative. Sequence gate 126 acts in the current switching mode, and the resultant increase in current through resistor R36 renders transistor 9Q nonconductive. The resultant increase in potential at the base of transistor 10Q in the inverter circuit 127 renders that transistor conductive, so that the poential applied to conductor 134 abruptly drops from an approximately 12-volt value to approximately ground. This potential is applied to the counter reset circuit 81 (FIG. 1) and to the driver circuit 93 (FIG. 3). The negative-going signal applied via conductor 134 produces no effect on the condition of transistor 11Q in the counter 12Q in the driver circuit 93 (FIG. 3), since the negative pulse via capacitor C15 is grounded through rectifier RE34.

At the thirteenth pulse on conductor 54 (FIG. 4) the units counter 85 is advanced to its next step so that the condition of coincidence which previously existed at the coincidence circuit 99 is terminated and so that the potential on conductor 124 again rises to a positive value. As a result, transistor 9Q (FIG. 5) again becomes conductive which renders transistor 10Q non-conductive. The resultant rise in potential on conductor 134 causes capacitor C14 (FIG. 1) to apply a positive pulse to the base of transistor 11Q to render that transistor conducreset circuit 81 (FIG. 1) since the negative pulse through capacitor C14 is grounded through rectifier RE33. For similar reasons, this negative-going signal on conductor 134 is not effective to change the condition of transistor tive. As capacitor C14 charges, the conductivity of transistor 11Q is reduced so that a short-duration negative-going pulse is applied to the counter reset lead 50 and hence to all stages of the units and tens counters 85 and 87 (FIG. 4) to reset the counters in preparation for the next timing operation.

The positive-going signal on conductor 134 similarly causes transistor 12Q in the driver circuit 93 (FIG. 3) to apply a short-duration negative-going pulse via conductor 136 through capacitors C16 and C17 and rectifiers RE35 and RE36 to the bases of transistors 15Q and 14Q, respectively. In view of their pre-existing condition, with transistor 15Q conducting and transistor 14Q not conducting, the application of this signal will reverse the state of the bistable multivibrator, causing transistor 15Q to become non-conductive, and transistor 14Q to become conductive. The termination of conduction in transistor 15Q will result in the application of a positive pulse to the bistable multivibrator system including transistors 16Q and 17Q via conductor 138 and capacitors C18 and C19, but those pulses will be blocked by rectifiers RE37 and RE38. Thus the sequence counter is now shifted to the "weld" state in which transistors 14Q and 17Q are conductive.

*Weld*

Under this condition, conductor 94 is the only one of the output conductors 92, 94, 96, 98 from the sequence counter matrix which is at ground potential. The ground on conductor 94 is applied to rectifier RE39 in the weld coincidence circuit 106 (FIG. 4). Circuit 106 includes a rectifier RE40, associated with the weld adjust units switch 108, and a rectifier RE41, associated with the tens weld adjust switch 110. The units and tens counters thereupon count the weld interval and when coincidence is reached, one count before the selected count, circuit 106 reaches coincidence to actuate the sequence gate circuit 126 and the inverter circuit 127 (FIG. 5) but, as before, the output signal applied to conductor 134 is ineffective to produce a useful result. At the next pulse on conductor 54 (FIG. 4), which represents the selected count, circuit 106 terminates coincidence and a signal is applied to conductor 134 (FIG. 5) to reset the units and tens counters 85 and 87 (FIG. 4) and to step the sequence counter 59 (FIG. 3). At this step, the first bistable multivibrator in the sequence counter 59 is switched to a condition in which transistor 14Q is non-conducting and transistor 15Q is conducting. The resultant reduction in potential on conductor 138 is applied to capacitors C18 and C19 to produce negative pulses via rectifiers RE37 and RE38 to the bases of transistors 16Q and 17Q to reverse the state of that multivibrator to a condition in which transistor 16Q is conducting, and transistor 17Q is not conducting. Thus, the weld interval has been timed and immediately at its termination, the sequence counter 59 has been shifted from its "weld" condition to its "hold" condition.

The transfer of the sequence counter 59 (FIG. 3) to the weld-interval state initiates the operation of the firing circuits shown in FIGS. 6 and 7 and the transfer of the sequence counter from the weld-interval state to its "hold" condition terminates the operation of those firing circuits. This is accomplished through the weld signal amplifier 53 (FIG. 5).

It will be recalled that prior to the termination of the delay interval established by the time delay unit 41 (FIG. 1), transistor 22Q is not conducting so that its collector is at a potential approaching 12 volts. This potential is applied to conductor 48 and thence via rectifier RE43 (FIG. 5) and resistor R42 to the base of transistor 31Q in the weld signal amplifier circuit 53. In addition, until such time as the sequence counter 59 (FIG. 3) is set to the weld-interval state, output conductor 94 therefrom is at a positive potential and this positive potential is applied via resistor R43 (FIG. 5) and rectifier RE44 to the base of transistor 31Q. Each of these positive potentials is capable of holding transistor 31Q at saturation despite the negative biasing potential applied thereto via resistor R44.

At the end of the time-delay interval, transistor 22Q (FIG. 1) is rendered non-conductive, and the potential on conductor 48 falls to a value approaching ground. This reduction in potential at the left-hand electrode of rectifier RE43 (FIG. 5) relieves that inhibition, so that transistor 31Q is enabled to become non-conductive in response to a subsequent reduction in potential on conductor 94.

When the sequence counter 59 (FIG. 3) is triggered to its weld-interval state, with transistors 14Q and 17Q conducting and transistors 15Q and 16Q non-conducting, the potential on conductor 94 is lowered to approximately ground. This reduction in potential, as applied to resistor R43 (FIG. 5) renders transistor 31Q non-conductive. Its collector rises in potential and this positive voltage is applied via conductor 20 to the firing control circuits of FIGURE 6 to initiate the operation of those circuits, as will be described hereinafter.

When, at the end of the weld-interval, the sequence counter 59 (FIG. 3) is triggered from its weld-interval state, the potential on conductor 94 rises from its approximately ground value to a positive value. This positive potential is communicated via conductor 94, resistor R43 (FIG. 5) and rectifier RE44 to the base of transistor 31Q to again render that transistor conductive and to abruptly reduce the potential applied to conductor 20, hence terminating the weld signal which is applied via conductor 20 to the firing control circuit of FIG. 6 and hence to terminate the operations of those circuits, as will be described.

Hold and off

When the sequence counter 59 is shifted to the "hold" condition, ground potential is applied to the "hold" lead 96 which is connected to the hold coincidence circuit 112 (FIG. 4) which is also associated with the units hold adjust switch 114 and the tens hold adjust switch 116. The circuits function in a manner similar to that previously described to time the hold interval and to prepare the circuits for the next subsequent interval which is the "off" time. Under some circumstances, it is desired to have a zero hold interval. This is not within the capability of the circuits of FIG. 4, so that if it is desired to skip directly from the weld interval to the "off" interval, the "zero hold" switch 140 (FIG. 3) is closed. With that switch closed, when the sequence counter is triggered to the "hold" state, the resultant reduction in the collector potential of transistor 16Q is applied through the zero hold switch 140 and via a network including capacitor C20, resistor R39 and rectifier RE42 to the base of transistor 15Q to reverse the state of the bistable multivibrator comprising of transistors 15Q and 14Q to a condition in which transistor 15Q is not conducting and transistor 14Q is conducting. This state of the sequence counter 59, in which transistors 14Q and 16Q are conducting, is the "off time" state of the sequence counter in which the "off time" lead 98 is the one of the group of leads 92, 94, 96 and 98 which is at ground potential. Thus, by the provision of the switch 140, the illustrated four-count sequence counter is converted to a three-count sequence counter. It will be appreciated that if the zero hold switch 140 is not closed, the system will count "hold time" and then will produce an indication, as described, to step the sequence counter to the "off time" state in which transistors 14Q and 16Q are conductive.

The illustrated apparatus has the capability of operating either upon a repeat mode or on a non-repeat mode, as controlled by the position of switch 142 (FIG. 5). Switch 142 is illustrated in its "repeat" position. In the repeat mode, the equipment will repeat the sequence indefinitely so long as the operator maintains the pilot switch PS (FIG. 1) actuated. When he releases the pilot switch, the system will continue the sequence through the selected "off" period and then will stop. In the non-repeat mode, the sequence will not repeat. If the operator releases the pilot before the end of the sequence, the system will cause the sequence to continue until the end of the "hold" interval but will not count "off" time. To again weld, the operator must reactuate the pilot after the termination of the "hold" interval.

Valve 144 (FIG. 1) controls the application of pressure to the welding gun electrodes. When that valve is operated, pressure is applied; when that valve is released, the electrodes are released so that the welding apparatus may be moved to a different point on the work or to a different workpiece. This valve is actuated except when the system is in the "off" interval or when the system is unactuated, such as following the "off" interval in normal repeat operation or when the operator has released pilot switch PS (FIG. 1).

Output conductor 98 from the sequence counter (FIG. 3) is at a positive potential under all conditions of the sequence counter except during the "off" interval. When conductor 98 is at that positive potential, transistor 29Q (FIG. 5) in the valve inverter circuit 93 is rendered conductive. That transistor, when non-conductive, applies a positive biasing potential to hold transistor 30Q in the valve driver circuit 95 conductive. However, when transistor 29Q is rendered conductive, the output potential at the collector thereof drops and conduction in transistor 30Q terminates. As a result the potential applied thereby to conductor 42 increases. This increased potential is communicated via means including resistors R5 and R6 (FIG. 1) to the control element of silicon control rectifier device CRE2 to render that device conductive. Accordingly, current from alternating current source 146 is permitted to flow through the bridge rectifier RE2 and through the now-closed contacts PCRb to provide alternating current energization of valve 144. However, when the sequence counter (FIG. 3) is stepped to the "off" state, conductor 98 becomes effectively grounded, and the valve inverter transistor 29Q (FIG. 5) becomes non-conductive to drive the valve driver transistor 30Q conductive so that the voltage on conductor 42 drops below the value which is required to maintain control rectifier device CRE2 (FIG. 1) conductive. Valve 140 is then released.

It may be noted that if switch 142 (FIG. 5) is in its non-repeat position, the termination of conductivity of transistor 29Q at the beginning of the "off" interval produces an increase in potential at the collector of that transistor which is communicated through switch 142 to conductor 56 and thence to rectifier RE11 (FIG. 2) in the counter gate 51 to inhibit that gate and thus to terminate counting so that the "off" time is in fact not counted under these circumstances.

It will be observed that conductor 98, which controls the operation of the valve inverter 93 (FIG. 5), as just described, is also connected to an input of the PCR inverter circuit 95a. During non-repeat operation, in which switch 142 is shifted from its illustrated position, that one of the inputs to transistor 24Q which includes rectifier RE45 is open and is of no effect. Therefore, when conductor 98 is at its more positive potential, that positive signal is applied via rectifier RE46 and a network including resistors R45 and R46 to the base of transistor 24Q to render that transistor conductive. The resultant drop in the potential at the collector thereof is communicated to the base of transistor 21Q in the PCR driver circuit 97 to render that transistor non-conductive. The resultant rise in potential at the collector thereof is communicated via conductor 44 and by means including resistors R3 and R2 (FIG. 1) to the control element of silicon controlled rectifier CRE1, enabling that device to conduct. As a result, bridge rectifier RE1 is enabled to pass alternating current from source 1S through closed contacts PCRa to hold relay PCR energized independently of whether pilot switch PS is released or not.

In the non-repeat mode of operation, conductor 98 (FIG. 5) is grounded at the initiation of the "off" interval to render transistor 24Q (FIG. 5) non-conductive, which causes transistor 21Q to become conductive to reduce the potential applied to conductor 44 and hence terminate the conductivity of silicon controlled rectifier CRE1 (FIG. 1) and interrupt the holding circuit for relay PCR.

For the repeat mode of operation, switch 142 (FIG. 5) is moved to its illustrated position to connect that input to the PCR inverter 95a which includes rectifier RE45 to the lockout circuit 55 via conductor 134. Transistor 25Q in lockout circuit 55 serves, during the repeat mode of operation, to hold relay PCR (FIG. 1) operated during the "off" interval.

It will be recalled that after the elapse of the initial time delay, transistor 22Q (FIG. 1) is rendered conductive to reduce the potential applied to conductor 48. This reduced potential is applied via resistors R47 and R48 (FIG. 5) to the base of transistor 25Q in the lockout circuit 55 to render that transistor non-conductive. The increase in the potential on conductor 134 which results from the reduction in current through load resistor R49 is applied through the repeat switch 142, when that switch is in its repeat position as illustrated, to rectifier RE45 and, by means of a network including resistors R45 and R46, to the base of transistor 24Q, rendering or holding that transistor conductive. Since transistor 22Q (FIG. 1) remains conductive throughout the sequence, transistor 25Q remains non-conductive so that transistor 24Q is held conductive throughout that sequence. As a result, transistor 21Q is held non-conductive even during the "off" interval, so that rectifier CRE1 (FIG. 1) remains enabled to conduct and relay PCR continues to be held operated.

It will be observed that transistors 25Q and 10Q (FIG. 5) share a common collector load R49. For one full count before the end of the preselected "off" interval, the "off" coincidence circuit 118 (FIG. 4) is at coincidence so that the sequence gate transistor 9Q (FIG. 5) is rendered non-conductive, to render transistor 10Q conductive. As a result conductor 134 drops to a lower potential which is insufficient, when applied to rectifier RE45, to hold the PCR inverter transistor 24Q conductive, and that transistor becomes non-conductive. It will be noted that while the voltage applied to rectifier RE45 is similarly reduced at the establishment of coincidence during the squeeze, weld and hold intervals, transistor 24Q, during those periods, is held conductive via the input including rectifier RE46. When transistor 24Q becomes non-conductive, transistor 21Q is rendered conductive to reduce the voltage applied to conductor 44 and hence to terminate the conductivity of rectifier CRE1 (FIG. 1) and hence to interrupt the holding circuit for relay PCR.

*Firing circuits*

In general, the circuits illustrated on FIGS. 6 and 7 of the drawings comprise a pair of ignitrons IG1 and IG2 (or other controlled contactor means) for selectively connecting a source of energy S1 (which desirably is phase related to source 1S) to a welding transformer WT for controlling the application of energy to a workpiece WP which is to be welded. The ignitrons IG1 and IG2 are controlled by individual firing circuits including controlled rectifiers 1CRE and 2CRE. Those firing circuits are operated under the control of driving circuits including transistors Q17 and Q18, and transistors Q19 and Q20. Those driving circuits are, in turn, controlled by four separate circuits including a delayed firing system, comprising unijunction transistor 1UJ and transistors Q1 through Q4, an ignitron anode voltage sensing system comprising transistors Q5 through Q7, a lead-trail control circuit comprising transistors Q8 and Q9, and a heat control circuit comprising transistors Q10 through Q16.

In the customary present commercial practice, ignitrons, or the like, are customarily employed with so-called anode firing circuits in which the voltage applied across the ignitron also serves as the energizing or plate voltage for the controlling or firing device, such as a thyratron, in the firing circuit. In such systems, the peak line voltage, which can be high due to transients, is in large part applied directly across the firing device which has made it difficult satisfactorily to adapt the system to the use of solid-state firing devices in view of their sensitivity to voltage transients. If the rate of voltage rise is sufficient, as it can well be with line-voltage transients, the firing device can, improperly, fire even though there be no input signal.

In the present arrangement, the problems arising from the transient-voltage sensitivity characteristics of solid-state devices, such as silicon controlled rectifiers, are effectively solved by isolating the firing devices from the line. Specifically, a separate-excitation circuit is employed and filtering means are employed between the source of voltage and the device to suppress transient voltage peaks. As a further means, additional filtering means are or may be provided between that device and the ignitron to control the rate of increase of the igniter current.

Among the other advantages which accrue from the disclosed arrangement is the fact that it provides a wide latitude in the selection of the firing angle of the ignitrons, and they can be fired earlier in the half cycle than in the customary commercial circuits.

The two ignitrons IG1 and IG2 are connected in back-to-back or antiparallel relationship between the source S1 and the primary winding of the welding transformer WT, in a manner well known in the art. The operation of these ignitrons is controlled by firing circuits including devices 1CRE and 2CRE. To effectively preclude dangerous premature firing of the ignitrons, the circuits are controlled by contacts NWCRa of relay NWCR (FIG. 1). The no-weld-control relay NWCR may well not operate at a point of zero line voltage and could result in a transient signal which would improperly actuate the firing circuit. The illustrated circuits obviate this possible malfunctioning.

When contacts NWCRa are closed, a circuit is completed from the source S1, through that switch and through fuses F1 and F2 to energize the transformer primary winding T1P, which is inductively coupled to secondary windings T1S1 and T1S2 of that transformer. Secondary windings T1S1 and T1S2 are connected in out-of-phase relationship and the phase relationships of the several windings of that transformer are indicated by the dot placed adjacent one end of each of the windings T1P, T1S1 and T1S2 to denote those winding ends which are of the same polarity at a given instant.

When the voltage across winding T1P is such that the left-hand end of that winding is positive relative to the right-hand end, for example, the voltage induced across secondary winding T1S2 is such that its upper end is positive relative to its lower end. Under that condition, current flows in a circuit including resistor RS1b and rectifier rent flows in a circuit including resistor RS1b and rectifier 23RE to charge capacitor 21C so that its upper electrode becomes positive relative to its lower electrode. As will be seen, the energy stored by capacitor 21C is utilized to fire ignitron IG2. Charging resistor RS1b may be provided as a separate element, but in a constructed embodiment of the invention, the effective resistance of the secondary winding T1S2 was found to be adequate and resistor RS1b is illustrated in dotted lines to connote that it represents the internal resistance of that winding.

I will be observed that during this same half cycle, the polarity of the voltage across secondary winding T1S1 is such that rectifier 22RE blocks current flow and hence capacitor 20C does not charge during this half cycle. However, during the subsequent half cycle, in which the polarity is reversed, capacitor 20C is charged in a manner similar to that above described in connection with capacitor 21C, in preparation for the firing of ignitron IG1.

Thus, at the end of one full cycle of the current from source S1 following the operation of relay NWCR, both capacitors 20C and 21C are charged in preparation for the operation of the system. Until they charge, the firing circuits cannot actuate the ignitrons. This one-cycle delay serves as a safety measure to insure that the welding electrodes will have engaged the workpiece before welding current is applied to the welding transformer. In the customary timers, squeeze time must be initiated before relay NWCR will close and the necessity of charging capacitors 20 C and 21 C in order to enable the firing circuits to fire the ignitrons IG1 and IG2 requires that the squeeze time be at least one cycle in duration.

In the preferred arrangement, capacitors 20C and 21C are made sufficiently large to store a substantial amount of energy which may be abruptly discharged through the input circuits of the ignitrons. Once those capacitors are charged, this energy is available for application to those circuits, but cannot be so applied until the control rectifier devices 1CRE and 2CRE have a suitable gating potential applied to their control electrodes or gates.

Means are provided for applying gating pulses to the silicon controlled rectifier devices 1CRE and 2CRE in selectable timed relation to the voltage applied to the anodes of the ignitrons. When the gating signal is applied to controlled rectifier 2CRE (during the half cycle of the source voltage in which the anode of ignitron IG2 is positive relative to its cathode), that rectifier is rendered conductive to establish a discharging path for capacitor 21C through that rectifier, inductor or choke CH2, resistor 87R, fuse F5, through the igniter-cathode path in tube IG2 and back to capacitor 21C. In the preferred arrangement, capacitors 20C and 21C are preferably of substantial capacitance (such as 20 microfarads) so that a substantial amount of energy can be delivered to the input circuits of the ignitrons. It is a characteristic of the preferred controlled rectifiers 1CRE and 2CRE that when conduction is initiated by virtue of the application of an input signal to their gates, the termination of the gating pulse will not in and of itself terminate conductivity of those devices.

In response to the signal applied to the input circuit of ignitron RG2, that ignitron will conduct between its anode and cathode, producing energization of the welding transformer WT from the source S1 and a resultant application of a pulse of energy to the workpiece WP. In a similar manner, ignitron IG1 is rendered conductive at a selectable point in that half cycle during which its anode is positive relative to its cathode to similarly energize transformer WT to apply a pulse of energy to the workpiece WP.

It will be observed that the firing energy storage means, such as capacitor 21C, together with the resistance in its charging circuit, such as the illustrated internal resistance RS1b of transformer winding T1S2, constitute a resistance-capacitance low-pass filter or integrating network. As a result, if the line voltage abruptly and transiently changes, tending to induce a transient voltage peak across secondary winding T1S2, that resistance-capacitance network will effectively suppress the voltage peak from appearing at the controlled rectifier device 2CRE and effectively preclude any such transient from producing a sufficient rate of change of current to cause that device improperly to beome conductive.

It will further be noted that the circuit including choke CH2 and the resistance in the discharging circuit for capacitor 21C, including resistor 87R, constitute a filter for limiting the rate of change of the discharge current of capacitor 21C so as to limit the magnitude of the current in the input circuit of the ignitron.

Resistors 78R and 85R, which are connected in parallel with capacitors 21C and 20C, respectively, are preferably of sufficiently large resistance so that they do not significantly affect the normal operation of the circuit. In a practical embodiment, those two resistors were selected to have a value of about 50,000 ohms so that the network including the associated capacitor had a time constant of one second, which is large relative to the normal interval between the charging of the capacitor and the time at which the firing circuit will be triggered to apply the pulse of energy to the ignitron. However, at the termination of the operation, when relay NWCR is opened, those resistors serve to discharge their associated capacitor as a safety measure.

The gate signals for the controlled rectifier devices 1CRE and 2CRE are applied through pulse transformers T3 and T4, respectively. Any pulse appearing across the secondary winding of transformer T4, for example, which is of a polarity such that the left-hand end of that winding is positive relative to the right-hand end, is dissipated through rectifier 20RE and resistor 74R. A pulse of the opposite polarity is applied to the input or gate circuit of controlled rectifier 2CRE via resistor 74R to cause that device to apply a discharge pulse from capacitor 21C to the input circuit of ignitron IG2, as above described. The network comprising capacitor 23C and resistors 74R and 75R are elements of a circuit for filtering high-frequency spurious transients and for effectively preventing improper actuation of the controlled rectifier device by transients. The gating pulses applied through transformer T4 are of sufficient magnitude to produce gating of the device despite this filtering or desensitizing network. The other firing circuit operates in a similar manner.

The application of pulses to the pulse transformers T3 and T4 is controlled by the driving circuit comprising transistors Q17 and Q18 and the driving circuit comprising transistors Q19 and Q20, respectively. These driving circuits are controlled by a delayed firing system via conductor 10, by an ignitron anode voltage sensing system via a conductor 12, by a lead-trail control circuit which is connected to the two driving circuits via leads 14 and 16, respectively, and by a heat control circuit via conductor 17. As will be seen, in the illustrated arrangement, each of these leads may be at either of two selected voltages. In the illustrated arrangement these have been selected to be a positive voltage (such as positive 12 volts) and ground.

Conductor 10 is connected to the bases of transistors Q17 and Q19 through resistors 48R and 54R, respectively; conductor 12 is connected to the bases of those transistors through resistors 49R and 55R, respectively; conductor 14 is connected to the base of transistor Q17 through resistor 52R; conductor 16 is connected to the base of transistor Q19 through resistor 53R; and conductor 17 is connected to the bases of transistors Q17 and Q19 via resistors 50R and 51R, respectively.

The emitters of transistors Q17 and Q19 are grounded and their collectors are connected to a source of positive potential through load resistors 57R and 56R, respectively. Negative biasing voltages are applied to the bases of those transistors through resistors 78R and 79R, respectively. If any one of the conductors 10, 12, 14 or 17 is at the noted positive potential (assumed to be 12 volts) transistor Q17 is biased effectively to saturation, and similarly, if any one of the conductors 10, 12, 16 or 17 is at the noted positive potential, transistor Q19 is biased effectively to saturation. These input networks therefore constitute, in effect, "or" gates under which if any one of the noted conductors associated with transistor Q17 or Q19 is at its positive potential or state, the associated transistor is biased effectively to saturation. Under that condition, the collector of that transistor is at a relatively low potential, herein assumed to be ground potential. However, at the instant that all of the noted conductors associated with the transistor concurrently reach the lower (ground) potential, the voltage at the base of that transistor drops sufficiently to render that transistor effectively non-conductive. For example, whenever all of the conductors 10, 12, 16 and 17 concurrently reach ground potential, transistor Q19 is rendered non-conductive and as a result a positive-going pulse is applied through the capacitor 14C to the base of transistor Q20. The emitter of transistor Q20 is grounded, and the collector is connected to a source of positive potential through the primary winding of transformer T4 and via switch SW1. The base is connected to a source of negative potential through resistor 59R. As a result of the application of the positive pulse to the base, transistor Q20 conducts current from the positive source through switch SW1, and through the primary winding of transformer T4 so that a pulse is induced in the secondary winding of that transformer. The shape and duration of the pulse which is applied to the base of transistor Q20, and hence the shape and duration of the pulse applied to the controlled rectifier device 2CRE via transformer T4 is controlled by means including resistor 56R, capacitor 14C and the resistance of the base of transistor Q20. Rectifier 4RE serves to prevent any substantial negative voltage from being applied to the base of transistor Q20. Rectifier 19RE serves to dissipate the voltage which is induced across the primary winding of transformer T4 upon the collapse of the magnetic field at the termination of conduction of transistor Q20 at the end of the pulse.

The driving circuit including transistors Q17 and Q18 operates in a similar fashion, producing a pulse of energy at transformer T3 in the event that and when the voltages on conductors 10, 12, 14 and 17 all reach their lower or ground potential. It will be noted that switch SW1 also controls the application of positive voltage to the collector of transistor Q18. This switch is provided as a further safety measure and preferably is a contact of or is controlled by the weld-no-weld switch customarily provided in resistance-welder timers and which must be closed in order for welding to proceed. Whenever that switch is open, the driving circuits are incapable of applying pulses through transformers T3 and T4 to the firing ciruits.

*Lead-trail and delayed firing*

The lead-trail circuit comprising transistors Q8 and Q9 (FIG. 7) controls, via conductors 14 and 16, which of the two driving circuits and hence which of the two firing circuits can operate at any time, and alternately enables those circuits. This circuit is energized via a transformer, the primary winding T10P of which is lliustrated to be connected across the source S1 and the secondary wnding T10S of which appears on FIG. 7. When the upper terminal of the secondary winding T10S is positive with respect to the grounded center tap, which occurs when the left-hand terminals of source S1 and primary winding T10P are positive relative to their other terminals, current flows through rectifier 9RE, resistor 66R, resistor 68R, and via the base and emitter of transistor Q8 back to the grounded center tap of secondary winding T10S. The base of transistor Q8 is connected to a source of negative potential through resistor 34R,the emitter is grounded, and the collector is connected to a source of positive potential through load resistor 10R. When the base is driven positive, as described, transistor Q8 conducts substantially at saturation and the voltage at its collector drops effectively to ground potential. This voltage is applied via conductor 14 and through resistor 52R to the base of transistor Q17 in the driving circuit associated with ignitron IG1. This is an enabling signal, which, other conditions met, will permit the firing circuit associated with ignitron IG1 to fire that ignitron, and it will be observed that this occurs during the half cycle in which the anode of ignitron IG1 is positive with respect to its cathode.

During the same half cycle, the lower terminal of transformer secondary T10S is negative with respect to ground so that transistor Q9 is effectively non-conductive in view of the connection of its base to a source of negative potential through resistor 35R. Consequently, a positive voltage (e.g., 12 volts) is applied via conductor 16 and through resistor 53R to the base of transistor Q19 to disable that driving circuit and the firing circuit including controlled rectifier 2CRE to fire ignitron IG2.

In the preferred arrangement, the turns ratio of the transformer including windings T10P and T10S is selected so that a fairly high secondary voltage is applied to the lead-trail circuit such as, for example, 115 volts. As a result, a quite substantial peak positive voltage is applied through rectifier 9RE and resistor 66R. However, rectifier 16RE is connected between a point at the junction of resistors 66R and 68R to a source of much lower positive potential (e.g., 12 volts). Accordingly, rectifier 16RE tends to clamp the voltage at the junction between resistor 66R and 68R to insure that the maximum positive voltage applied to the base of transistor Q8 does not exceed that selected value. Since transistor Q8 will operate with a voltage applied to the base of substantially less than that value, the operating point for that transistor occurs early in the half cycle of the line voltage, approaching quite closely the zero-degree point. Transistor Q8 will remain conductive throughout essentially the complete half cycle and during the alternate half cycle will be non-conductive, whereas transistor Q9 will be conductive in the opposite half cycle. Rectifiers 24RE and 13RE are provided to prevent negative pulses from being applied to the bases of transistors Q8 and Q9, respectively.

The lead-trail circuit, when connected as illustrated, operates continuously whenever the source S1 is connected, operating transistors Q8 and Q9 during alternate half cycles so as alternately to enable the firing circuits associated with ignitrons IG1 and IG2. In order to control when welding occurs and additionally to provide a means for effectively preventing firing during the first half cycle thereafter so as to prevent saturation of certain types of welding transformer cores, the delayed firing system illustrated in FIG. 6 of the drawings, is provided. The delayed firing system, including unijunction transistor 1UJ and transistors Q1 through Q4, is actuated by a weld signal applied to conductor 20 (FIGS. 1 and 6). It will be recalled that this signal is applied to conductor 20 when the timer has been set and desirably is synchronized with the voltage from source S1 so that the operating signal is both applied and removed at the zero degree points of the source voltage. In the illustrated arrangement, it is assumed that the weld signal applied to conductor 20 is at an appropriate positive value (e.g., 12 volts) and that the conductor 20 is grounded in the absence of a weld signal.

When the positive weld signal is applied to conductor 20, it appears across a network comprising resistor 30R, variable resistor VR1, and capacitor 1C. The voltage across capacitor 1C is applied to the emitter electrode 21 of unijunction transistor 1UJ, one base electrode 22 of which is connected to a source of positive potential through resistor 1R. The other base electrode 24 of that double-base diode device is connected to ground through a resistor 4R. Capacitor 1C charges at a rate controlled by resistor 30R and variable resistor VR1, which selects the delay established by the delayed firing system. When the voltage applied to emitter 21 rises to a sufficient value, the impedance of the unijunction device 1UJ between the emitter and base electrode 24 abruptly falls and capacitor 1C discharges over a path including electrodes 21 and 24 and resistor 4R. When capacitor 1C has discharged sufficiently, the voltage applied to emitter 21 falls below the voltage required to maintain the forward bias condition and unijection device 1UJ changes to a high impedance condition so that capacitor 1C can again commence to charge via resistor 30R and variable resistor VR1. This operation repeats, in the nature of a relaxation oscillator, producing a series of positive-going short-duration pulses across resistor 4R. The time between the receipt of the weld signal via conductor 20 and the first such pulse is closely established, but the oscillatory rate is not synchronized or necessarily related to the frequency of the source S1.

The positive-going pulse appearing across resistor 4R is applied via resistor 12R to the base of transistor Q1. The base of transistor Q1 is connected to the source of negative potential through resistor 38R, the emitter thereof is grounded and the collector is connected to the source of positive potential through load resistor 5R. Transistor Q1 is driven effectively to saturation and as a result a relatively large amplitude negative-going pulse is applied through capacitor 3C and rectifier 1RE to the base of transistor Q2. Transistors Q2 and Q3 are cross-coupled to form a flip-flop or multivibrator circuit, with the collector of transistor Q2 being coupled to the base of transistor Q3 by the network comprising capacitor 5C and resistors 26R and 33R and with the collector of transistor Q3 being coupled to the base of transistor Q2 through a similar network compressing resistors 25R and 32R and capacitor 4C. The collectors of transistors Q2 and Q3 are connected to a source of positive potential through load resistors 6R and 7R, respectively, the bases of those two transistors are connected to a source of negative potential through resistors 32R and 33R, respectively, and the emitters of those transistors are grounded. Transistors Q2 and Q3 conduct alternatively and desirably means are provided for insuring that prior to the receipt of the described pulse, transistor Q2 is conducting effectively to saturation whereas transistor Q3 is cut off. In the illustrated circuit, a signal derived from the timer is employed to serve this function. This signal, applied to conductor 26, is assumed to be a positive voltage (e.g., 12 volts) which is applied to conductor 26 at all times before operation of the timer is initiated. This signal could, of course, be derived from any other suitable source.

The positive voltage on conductor 26 is applied to the base of transistor Q2 through resistor 31R and serves to maintain transistor Q2 in a conductive state. When that signal terminates at the time of initiation of the timer (and prior to the application of a signal to conductor 20), the circuit comprising transistors Q2 and Q3 remain in the same state, with transistor Q2 conducting and resistor Q3 non-conductive. However, when the abrupt negative-going signal is applied to the base of transistor Q2 via rectifier 1RE, transistor Q2 is cut off, its collector voltage abruptly rises, and the resulting positive-going signal is applied via capacitor 5C and resistor 26R to the base of transistor Q3 to render that device conductive. The circuit regeneratively switches its state. The successive negative pulses applied to the base of transistor Q2 via rectifier 1RE from transistor Q1 will not be effective to change the state of transistors Q2 and Q3 since transistor Q2 is already non-conductive under this condition.

When transistor Q2 is rendered non-conductive, the collector voltage rises abruptly and this signal is applied to the base of transistor Q4 via resistor 40R, that base being connected to a source of negative potential through resistor 46R. The collector of the grounded emitter transistor Q4 is connected to a source of positive potential through load resistor 8R, and when transistor Q4 conducts in response to the positive signal applied to its base, its collector abruptly drops from the intital positive potential (e.g., 12 volts) to a lower potential, such as ground, and this signal is applied through rectifier 4RE to the conductor 10 which is connected to the driving circuits as previously described. It will be recalled that when this signal is applied to conductor 10, the driving circuits (including transistors Q17 through Q20) are enabled to operate as far as this particular control is concerned, that is, the delayed firing system is no longer able to prevent operation of the ignitrons by the firing circuits.

It will be observed that when transistor Q3 is conducting, its base, and hence the upper electrode of capacitor 6C is at a potential substantially below the voltage applied to the lower electrode of that capacitor via conductor 20, that is, lower than the weld signal voltage. As a result, when the weld signal terminates so that conductor 20 becomes abruptly grounded (which desirably occurs at the zero degree point of the sine wave from source S1), a negative pulse is applied from capacitor 6C through rectifier 2RE to the base of transistor Q3 to render that transistor non-conductive and to thereby cause transistor Q2 to become conductive. Since the termination of the weld signal applied to conductor 20 also terminates the operation of the oscillatory circuit including capacitor 1C and unijunction device 1UJ, there will be no additional pulses applied to the base of transistor Q2 so that the circuit comprising transistors Q2 and Q3 will remain in this state until the next weld signal is received.

It will be seen that the delayed firing system applies a disabling voltage to conductor 10 at all times that the weld signal is not being applied to conductor 18, but that it will shift the potential on conductor 10 to an enabling voltage a timed interval after the weld signal is applied to conductor 18. Since the weld signal appears at the beginning of the weld interval, the delayed firing circuit will be effective during the first half cycle of the line frequency, only, to prevent firing of either of the ignitrons for a preselected interval even though other elements of the circuits may indicate that welding may proceed. It is presently believed that the optimum delay period is 87½° after the zero degree point of the sine wave of the source S1 at which the weld signal is applied to conductor 20. This interval may be varied to accommodate variations in the power factor of the load by variable resistor VR1. It is desirable, however, that the magnitude of the delay be quite precisely selectable, which is one of the reasons for the present preference for the unijunction device 1UJ for this function. The discharge point of such devices, in properly designed circuits, is substantially independent of supply voltage variations. Additionally, with proper circuit design including desirably the use of a temperature compensated resistor 1R, the emitter voltage at which the device will discharge is substantially independent of temperature. Further, since the device operates at an input voltage which is quite low relative to the voltage on conductor 20, the essentially linear portion of the charging curve of capacitor 1C is utilized. As a result the illustrated system provides extremely precise timing of the interval between the application of an appropriate potential to the weld line 20 (at the zero degree point) and the instant at which the firing circuits are enabled to fire during the first one-half cycle of operation.

It should again be noted that this delayed firing system does not necessarily cause firing of the ignitrons but merely establishes a minimum firing angle for the first half cycle, and that after the first half cycle of any weld, it is ineffective to interfere with the free selection of the firing points of the ignitrons.

*Heat control*

The heat control circuit, comprising transistors Q10 through Q16, selectively controls the firing angles of the ignitrons IG1 and IG2 to control the percent heat and hence the magnitude of the energy delivered to the workpiece WP. In general, the heat control has a capacity to produce firing of those ignitrons at any selected phase angle provided the other conditions established by the circuitry are met. Among those other conditions, of course, in the illustrated arrangement, is that if the heat control be set to fire the ignitrons at a phase angle less than a selected value in the order of 87½°, no such firing will occur during the first half cycle of the weld until after that minimum delay angle which is established by the delayed firing system.

The alternating current signal apearing across the secondary winding T10S (FIG. 7) is synchronized with the source S1. This signal is full-wave rectified by rectifiers 10RE and 11RE and applied through resistor 65R to one electrode of rectifier 15RE, the other electrode of which is connected to a source of negative potential. Rectifier 15RE prevents the voltage on conductor 32 from becoming more negative than a selected value, such as negative 12 volts. If the magnitude of the voltage of the negative peaks of the full-wave rectified signal be large relative to that selected negative 12 volt value, then the voltage on conductor 32 will be in the form of a negative 12 volt signal with a positive-going (to ground) spike each 180°.

This signal is applied through resistor 72R at the base of transistor Q10, that base being connected to a suitable source of positive potential through resistor 82R. Transistors Q10 and Q11 are interconnected as a multivibrator in a form of Schmitt trigger circuit, with the collector of transistor Q10 being coupled to the base of transistor Q11 via a network comprising capacitor 25C and resistors 44R and 22R, and with the emitters of the two transistors being coupled via resistor 63R. When the voltage on conductor 32 is at the negative 12 volt level, transistor Q10 is held in a non-conductive state and transistor Q11 is conducting. At the positive-going input signal applied via conductor 32 to the base of transistor Q10, transistor Q10 begins to become conductive and as a result of the coupling between transistors Q10 and Q11, transistor Q10 becomes fully conductive very rapidly and transistor Q11 is driven below cutoff. The magnitude of the input voltage to the base of transistor Q10 at which this triggering will occur is quite precise and repetitive and the point at which the triggering occurs in relation to the voltage of source S1 can be precisely selected by selection of the parameters of the trigger circuitry, by selection of the turns ratio of transformer T10 to control the magnitude of the A.C. voltage across secondary winding T10S, and by selection of the magnitude of the negative biasing voltage applied to rectifier 15RE. In a constructed arrangement, with 115 volts across the secondary winding T10S, the circuit comprising transistors Q10 and Q11 was accurately triggered 10° in advance of the zero degree point (and the 180° point) on the A.C. wave form, transistor T10 being rendered conductive and transistor Q11 being rendered non-conductive.

The trigger remains in this condition until the positive signal diminishes toward the selected negative 12 volt point and in the constructed embodiment, this occurred at about 10° after the zero degree point (and the 180° point) of the wave form of the source S1. At that time, transistor Q10 again becomes non-conductive and transistor Q11 again becomes conductive. When transistor Q11 is conducting, its collector voltage is at a relatively low value, approaching ground. When transistor Q11 is non-conductive, at each pulse on conductor 32, its collector voltage is at a higher voltage such as 12 volts positive. Consequently, during the operation of the circuit, conductor 34 is supplied 120 times per second with a positive-going (from ground to positive 12 volts) essentially square-wave pulse of relatively short (e.g., 20°) duration and having its leading edge accurately related to and in advance of (e.g., 10°) of the zero degree point (and 180° point) on the A.C. wave form of source S1.

These pulses are applied to the base of transistor Q12 by a network comprising capacitor 9C and resistors 61R and 45R. Transistor Q12 is rendered conductive by each such pulse to apply a corresponding series of negative-going pulses to a multivibrator circuit comprising transistors Q14 and Q15 via a network including capacitor 10C and rectifier 5RE. The multivibrator including transistors Q14 and Q15 is similar to the multivibrator comprising transistors Q2 and Q3 (FIG. 1) above described and operates in a similar fashion. Transistor Q14 is normally cut off and transistor Q15 is normally conducting.

At each of the short-duration negative-going pulses applied to the base of transistor Q14 by transistor Q12, transistor Q14 is turned off and transistor Q15 is turned on. When transistor Q15 is triggered to its conductive state, its collector voltage falls essentially to ground potential and this voltage is applied via conductor 15 and a network including resistors 43R and 47R to the base of transistor Q13 to block conduction in that transistor. As a result, the collector voltage of transistor Q13, at conductor 17, is approximately 12 volts positive. This signal is applied through resistor 50R to conductor 18 to disable the driving circuit comprising transistors Q17 and Q18 and is applied via resistor 51R to conductor 19 to disable the driving circuit comprising transistors Q19 and Q20. It will be noted that this occurs slightly (e.g., 10°) before the cycle commences.

When transistor Q14 is rendered non-conductive just prior to the beginning of a cycle, the potential at its collector rises and is applied across the network comprising variable resistors VR2 and VR3, resistor 29R, and capacitor 2C. Capacitor 2C charges at a rate determined by the resistance of the charging circuit. Variable resistors VR2 and VR3 are provided to permit selection of the percent heat and the power factor adjustment, respectively. Resistor 29R establishes the maximum heat for which the system can be set, with VR2 and VR3 set to their minimum resistance positions.

The charge on capacitor 2C is applied to the emitter of unijunction transistor 2UJ which functions in the same manner as unijunction device 1UJ, previously described. When the voltage across capacitor 2C rises to a sufficient value, unijunction device 2UJ operates to apply a positive-going pulse to the base of transistor Q16 through a network comprising resistors 13R and 39R and capacitor 12C. Transistor Q16 is rendered conductive and desirably saturates, and its collector voltage drops from, say, 12 volts to approximately ground potential to develop a negative-going pulse which is applied through capacitor 11C and rectifier 6RE to the base of transistor Q15 to restore the trigger circuit comprising the transistors Q14, Q15 back to its original state. The reestablishment of conduction in transistor Q14 effectively removes the charging source for capacitor 2C. The termination of conduction through transistor Q15 results in the application of ground potential via conductor 15 and resistor 43R to the base of transistor Q13 to cause that device to become fully conductive. As a result, its collector voltage at conductor 17 drops substantially to ground potential which is communicated to conductors 18 and 19 through resistors 50R and 51R to enable the driving circuits and the firing circuits to fire the ignitrons IC1 and IC2, as far as this control is concerned. As will be seen, in the normal operation of the circuit, all of the other conditions enabling one of the two firing circuits to operate have normally been met prior to the receipt of this heat-control signal so that normally it is the application of ground potential to conductor 18 or 19 which actually produces the firing of the appropriate one of the two ignitrons IG1 and IG2.

*Anode voltage sensing*

The ignitron anode voltage sensing equipment including transistors Q5 through Q7 serves to overcome that which has been a serious disadvantage of separate excitation types of firing systems. The apparatus thus far described will function satisfactorily but is subject to possible misfiring with highly inductive loads. Thus, if the load current trails the load voltage due to the inductive reactance of the load, the ignitron which is fired during one-half cycle may continue to conduct even though the phase of the line voltage has reversed. Under this circumstance the voltage across the second ignitron may not rise sufficiently to permit firing of that ignitron until some time after the line voltage itself actually switches polarity. If this condition exists, it is possible for the system to misfire since the self-excitation firing system would discharge capacitor 20C or 21C into the ignitor circuit at the appropriate time even though the anode voltage of the associated ignitron may not have risen sufficiently to permit firing, and it is possible for the energy stored in the capacitor to be fully dissipated before the anode voltage rises adequately to permit conduction in the ignitron. The ignitron anode voltage sensing system obviates this possible malfunctioning.

Upon the closure of contacts NWCRa (FIG. 6) of the no-weld control relay NWCR (FIG. 1) primary winding T5P is connected between the anodes of the two ignitrons IG1 and IG2 in series with a pair of protective fuses. The voltage across that winding will therefore vary in accordance with the difference between the voltages at the anodes of the two ignitrons. When the anode voltage of either ignitron rises with respect to the other, a voltage is induced across the secondary winding T5S, which is full-wave rectified by rectifiers 7RE and 8RE and applied via resistor 54R to the upper electrode of rectifier 17RE, the lower electrode of which is connected to a suitable source of reference voltage such as positive 12 volts. A rise in voltage at the upper electrode of rectifier 17RE toward the clamped value of 12 volts is communicated via a network comprising resistors 70R and 71R to the base of transistor Q5 which is interconnected with transistor Q6 as a form of Schmitt trigger circuit similar to the circuit including transistors Q10 and Q11 previously described. In response to this signal, transistor Q5 abruptly conducts to saturation and transistor Q6 is abruptly cut off, transmitting a positive-going pulse to the base of transistor Q7 via a coupling network comprising capacitor 17C and resistors 60R and 42R. As a result, transistor Q7 is driven effectively to saturation so that its collector output voltage, applied to conductor 12, falls essentially to ground potential. This voltage is applied to the bases of transistors Q17 and Q19 to enable both of those driving circuits to actuate their associated firing circuit. However, this does not occur until the voltage between the anodes of the two ignitrons has actually changed and been sensed so as to prevent the above noted misfiring.

*Modified circuit*

The modified circuit illustrated in FIGS. 8 through 13 of the drawings is, in general, intended to perform functions similar to those of the system previously described, but is simplified and improved in certain respects.

In general, the modified system comprises a pulse generator 200 (FIG. 9), which serves as a source of pulses accurately synchronized with the line, a counter 202 (FIG. 8) which is representatively a 100-count binary counter for counting pulses from source 200, a switch-diode or hybrid matrix 204 (FIG. 8) which translates the output of counter 202 to signals on a group of output leads in accordance with the condition of operation of the system and in accordance with the count selected by the switch elements contained therein, a sequence counter 206 (FIG. 10) which successively establishes circuit conditions for the performance of a succession of welding functions, a sequence counter matrix 208 (FIG. 10) which translates the output of sequence counter 206, a control or coincidence circuit 210 (FIG. 9) which is controlled by the sequence counter 206 and its matrix 208 and by the switch-diode matrix 204 to control the performance of the functions of the apparatus and to control the resetting of counter 202 and the stepping of sequence counter 206, a control circuit 212 (FIG. 11) by means of which the operator controls the functioning of other elements of the system, a pressure control system 214 (FIG. 10) which controls the application of pressure to the welding electrodes, an ignitron firing circuit 216 (FIG. 13), including a welding transformer and ignitrons for controlling the current through the welding transformer, and firing control equipment including a firing delay circuit 218 (FIG. 12), a power factor angle detection circuit 220 (FIG. 12), a heat control circuit 222 (FIG. 13), and a firing pulser 224 (FIG. 12).

While the system may be operated on a one-stage pilot basis or upon a two-stage pilot basis, the operation of control circuit 212 will be illustratively described for two-stage operations. In this mode of operation, switch SW103 (FIG. 11) is open, switch SW105 is closed, switch SW101 is the first-stage pilot and switch SW104 is the second-stage pilot. The operator first closes switch SW101 which completes a circuit from a source of positive potential, conductor 228, the winding of relay PCR1, diode D182, and through switch SW101 to ground to operate relay PCR1. Relay PCR1, in operating, closes its contacts PCR1a to apply a positive voltage via conductor 230 to the upper terminal of resistor R1153 and the upper terminal resistor R1159 (FIG. 12) for a purpose to be hereinafter described, and also via resistor R1161 (FIG. 10) to the collector of transistor Q136 in the pressure control circuit 214. The base of transistor Q136, in addition to being connected to a source of negative bias through resistor R1160, is connected via resistor R196 to the collector of sequence-counter transistor Q122, which, as will be seen, is at this time at a potential approaching ground. As a result, transistor Q136, the emitter which is grounded, is biased to a nonconductive state, and the positive potential appearing at its collector is applied through diode D186 to the base of grounded-emitter transistor Q137 to render that transistor conductive and create current flow from a positive source of potential through now-closed contacts PCR1b and through the winding of relay SVCR1 to operate that relay. Relay SVCR1, in operating, closes its contacts SVCR1a and SVCR1b to complete an energizing circuit for solenoid valve 232 which, in a manner well known in the art, results in the application of pressure through the welding electrodes to the workpiece. Operation of the first-stage pilot does not initiate timing or weld current, and if the first-stage pilot switch SW101 is released at this point, the circuits will restore and release the pressure upon the welding electrodes.

As will be seen, the sequence counter 206 (FIG. 10) is initially set to a "squeeze" condition and sequence-counter transistor Q121 is, at this time, nonconductive and its collector is at a potential approaching 12 volts. That collector voltage is communicated via resistor R193, and conductor 236 to the base of resistor Q134 (FIG. 11) to render that transistor conductive. The resultant relatively low (approaching ground) potential at the collector thereof is applied via conductor 238 and through resistor R1126 (FIG. 9) to the base of transistor Q126 to relieve an inhibition upon pulse generator 200, as will be described. The potential at the collector of transistor Q134 is also applied via resistor R1155 to the base of transistor Q133 to prevent conduction through that transistor, and the resultant positive potential at the collector thereof is applied via a coupling network including resistor R1152 to the base of transistor Q132.

If the operator, having actuated switch SW101, wishes to proceed with the two-stage initiation of the operation of the system, he concurrently operates the second-stage switch SW104 (FIG. 11). This completes an energizing circuit for relay 2SCR1 from the positive potential on conductor 228 and through diode D170 and now-closed contact PCR1c. Relay 2SCR1, in operating, closes its contacts 2SCR1a to complete a latching circuit for relay 2SCR1 which is independent of the release of switch SW104. Relay 2SCR1, in operating, also closes its contact 2SCR1b and, since switch SW103 is open, this closure completes a circuit from the positive potential on conductor 228, through the winding of relay PCR1, through closed contacts 2SCR1b through now-closed contacts PCR1d, and through diode D183 to the collector of grounded-emitter transistor Q132. Since a positive potential is applied to the base of transistor Q132, it is in condition to become conductive to maintain a latching circuit for relay PCR1 to hold that relay operated after its initial energizing circuit is opened when the operator releases switch SW101.

Prior to the operation of relay 2SCR1, capacitor C100 (FIG. 11) is charged from a positive 12-volt source of potential through normally closed contacts 2SCR1c, resistor R1301, diode D200, conductor 266 and to capacitor C100 the lower terminal of which is grounded. Capacitor C100 remains thus charged even though contact PCR1e (FIG. 11), connected in parallel with contact 2SCR1c, was opened during the first stage of piloting. However, upon the opening of contact 2SCR1c, the charging circuit for capacitor C100 is opened and that capacitor discharges via conductor 266, through resistor R1302 (FIG. 9), diode D201, conductor 240 and through resistor R1134 which is connected to a source of negative potential. The time required for capacitor C100 to discharge establishes a time delay preliminary to the operation of the system primarily to permit the electromechanical relays to become stabilized.

*Clocking signals*

As capacitor C100 discharges, it removes an inhibition upon the operation of transistor Q126, to permit that transistor to pass pulses applied thereto. Thus, transistor Q125, and its associated circuits, constitute a form of clipper circuit which delivers to the base of transistor Q126, via coupling network including resistors R1129 and R1134, a series of distorted square-wave pulses derived from the sinusoidal signal from source 242 and with the positive-going edges thereof synchronized with the zero degree point of the sinusoidal wave form. Source 242 is accurately related to, or the same as, the source 244 (FIG. 13) which supplies alternating current to the ignitrons and welding transformer so as to provide synchronous operation. With the previously described inhibition upon the operation of transistor Q126 relieved, that is, with transistor Q126 enabled, transistor Q126 will deliver to conductor 246 a series of generally square-wave pulses, the negative-going edges of which are satisfactorily accurately synchronized with the zero degree point of the sine wave from source 242.

It may be noted that in view of the time constant to discharge circuit of capacitor C100, the voltage at conductor 240 will change over a period of time to produce, during that interval, approximately square wave output signals on conductor 246 of increasing amplitude. While, as will be seen, these signals are to be applied to the input of the counter 202, that counter will only respond to the first synchronous pulse which is of sufficient amplitude to trigger or change the state of the first stage of that counter, and all following pulses will be counted.

The synchronizing pulses or clocking pulses appearing on conductor 246 are applied through a coupling network to the base of transistor Q127 which inverts and amplifies those signals and applies them to conductor 248 for a purpose to be noted hereinafter.

*Counting*

The pulses on conductor 246 are also applied to counter 202 (FIG. 8). Counter 202 comprises a units counter and a tens counter each of which consists of four binary stages in a chain. The units counter comprises binary stages 250, 252, 254 and 256, and the tens counter comprises first, second, third and fourth stages 258, 260, 262 and 264, respectively. Each stage, of which stage 250 is representative, comprises a pair of transistors, such as transistors Q101 and Q102, cross coupled in a conventional form of bistable multivibrator. When the system is energized but prior to the pilot operation, capacitor C100 (FIG. 11) is, as above discussed, charged with its upper terminal positive, and hence conductor 266 at a positive value above ground. This positive potential on conductor 266 is applied through resistor R166 to the base of transistor Q102 to render transistor Q102 conductive, and transistor Q101 will become nonconductive. The potential on conductor 266 is similarly applied to the bases of the right-hand transistors in each of the other stages 252–264 so that all stages are initially set with their right-hand transistors conducting and their left-hand transistors not conducting. As will be seen, this represents a "squeeze" condition. When capacitor C100 is discharged upon the operation of the pilot switch or switches, as above discussed, the potential on conductor 266 shifts approximately to ground potential which enables the states of the several stages to be shifted in response to applied pulses.

An incoming pulse on conductor 246 is applied to the base of transistor Q101 in stage 250 by a coupling network including capacitor C101, and diode D101, and that signal is similarly applied to the base of transistor Q102 through a similar coupling network including diode D102. These coupling networks effectively differentiate the incoming signal, with diodes D101 and D102 preventing the effective application of any signal to the transistors derived from the positive-going edge of the square-wave form on conductor 246. However, at the first negative-going signal, a negative pulse is applied to the base of transistor Q102 to render that transistor nonconductive and hence to render transistor Q101 conductive. Each alternate negative-going signal on conductor 246 changes the state of stage 250 in a preselected sense.

When transistor Q102 is nonconductive, its collector, and hence conductor 270, is at a substantial positive value approaching and assumed to be 12 volts, and when transistor Q102 is conducting, its collector, and hence conductor 270, is at a lower value, herein assumed to be ground. When the potential on conductor 270 shifts from the positive value to the ground value, a negative-going pulse is applied to the bases of the transistors in the second units stage 252 to shift the state of that stage in a corresponding fashion so as to produce a similar change of potential upon output conductor 272 from that stage. The signal on output conductor 272 is applied to the input of stage 254 and its output signal, on conductor 274, is applied to the input of the fourth stage 256. The output of stage 256, appearing on conductor 276, is applied, as a carry, to the input of the tens counter comprising stages 258–264.

The four-stage units counter would normally complete one full cycle of operation in response to sixteen input pulses. However, in a manner known in the art, the output of the fourth stage 256, appearing on conductor 276, is coupled back to the base of the left-hand transistor of the second unit stage 252 through a network including capacitor C125 and resistor R1201 and to the base of the left-hand transistor of the third units stage 254 through a corresponding coupling network. As a result, the units counter completes a full cycle of operation in response to ten incoming pulses on conductor 246 rather than the sixteen pulses normally required. The tens counter is similarly arranged.

It will be observed that in the initial state of the units counter, prior to the receipt of the first pulse on conductor 246, all four stages 250–256 are conducting on their right-hand sides and all four of the output conductors 270, 272, 274 and 276 are at ground potential. In response to the first pulse on conductor 246, the units counter is switched to its second state in which output conductor 270 is at a positive potential and the other three output conductors remain at ground. At the third state of the units counter, following the second pulse on conductor 246, conductors 270, 274 and 276 are grounded and conductor 272 is at a positive potential; at the fourth state, conductors 270 and 272 are at positive potential and conductors 274 and 276 are grounded and conductor 272 is at a positive potential; at the fourth state, conductors 270 and 272 are at positive potential and conductors 274 and 276 are grounded; at the fifth state, output conductor 274 is at a positive potential and the other three are grounded; at the sixth state conductors 270 and 274 are at a positive potential and conductors 272 and 276 are grounded; at the seventh state conductors 270 and 276 are grounded and conductors 272 and 274 are at positive potential; at the eighth state, only output conductor 276 of this group is grounded; at the ninth state, following the eighth incoming pulse, only conductor 270 is grounded; and at the tenth state, following the ninth pulse, all four conductors are at a positive potential. The tenth pulse restores the units counter to its initial or first state in which all four output conductors 270–276 are grounded. Similar conditions exist upon the output conductors from the tens counter as successive carry pulses are applied to the tens counter.

*Matrix*

The output conductors 270–276 from the units counter are connected to the hybrid matrix 204, as are the corresponding output conductors on the tens counter. Hybrid matrix 204 comprises a units and a tens switch for each of the desired functions to be performed, and diode means associated therewith. In the illustrated arrangement, the four functions which are to be controlled are denominated "squeeze," "weld," "hold" and "off," so that matrix 204 comprises four switches associated with the units counter and four switches associated with the tens counter. Each switch, in the illustrated arrangement, comprises three banks of contacts, each bank including ten contacts. Wiper means are associated with each bank. In a number of instances, a plurality of wipers are associated with each bank, but all wipers for any one switch are mechanically intercoupled so that they are driven as a unit when the operator rotates the wiper shaft to select the count for the particular function.

The squeeze units switch comprises banks 280, 282 and 284. Cooperating with the ten contacts of banks 280 is a wiper assembly consisting, in the illustrated arrangement, of five wipers 286, 288, 290, 292 and 294 spaced to engage alternate contacts. These wipers are mounted on a common shaft in fixed angular relationship to one another and are rotated as a unit as the operator changes the setting of the swtich. Similarly, the bank 282 of the squeeze units switch comprises ten contacts with which two wipers 296 and 298 cooperate, with those two wipers being in a fixed angular relationship four contact intervals apart. A single wiper 300 cooperates with the contact of bank 284. Contact No. 10 of bank 280 is connected to conductor 270, and there are no connections to any other contacts in that bank. Contacts 9 and 10 of bank 282 (which are interconnected and shown to be in the form of a single arcuate member) are connected to conductor 272. In the third bank 284, an arcuate metallic contact 302, constituting contacts 5 through 8 of that bank, is connected to conductor 274 and an arcuate contact 304, constituting contacts 9 and 10, is connected to conductor 276. The wipers of bank 280 are connected through a diode D128 to an output conductor 306, the wipers of bank 282 are connected through diode D129 to that same conductor, and the wiper of bank 284 is connected through diode D130 to conductor 306. The wipers of the squeeze units switch are illustrated as they stand when that switch is in its first state, that is, when the operator has set the squeeze units switch for a count of "1." As the operator selects greater counts, all of the wipers are stepped, in unison, in a clockwise sense in the illustration.

The weld units switch 308 is similarly constructed and wired except only that its output is applied to conductor 310, and the hold units switch 312 and the off units switch 314 are correspondingly wired except that their outputs are applied to conductors 316 and 318, respectively.

The tens matrix 320 is similarly constructed and arranged. However, the ten steps, instead of being designated "1" through "10" as in the units counter, are designated "0" through "90." The outputs of the squeeze, weld, hold, and off, tens switches are applied to conductors 306, 310, 316, and 318, respectively. The four output conductors 306, 310, 316 and 318 from matrix 204 extend to the coincidence circuit 210 (FIG. 9), and, in conjunction with signals appearing on a group of output conductors 324, 326, 328, 330 and 332 from the sequence counter 206 (FIG. 10), control the operation of that coincidence circuit.

*Sequence counter*

The sequence counter (FIG. 10) serves to control the sequential performance of the selected functions and illustratively consists of three binary stages 334, 336 and 338. Stage 334 comprises a pair of transistors Q117 and Q118 which are cross coupled to constitute a bistable multivibrator which reverses state in response to each input pulse applied thereto via conductor 340. An input pulse on conductor 340 is applied to the base of transistor Q117 via a differentiating and steering circuit including capacitor C129 and diode D175 and the pulse is similarly applied to the base of transistor Q119 via a corresponding circuit including capacitor C130 and diode D176. A positive-going pulse is blocked by diodes D175 and D176, but a negative-going pulse serves to drive the one of the transistors Q117 and Q118 which is at that instant conductive to a nonconductive state, so that the other becomes conductive, to reverse the state of the stage. When transistor Q117 is conductive, output conductor 342 connected to the collector thereof is essentially at ground potential, whereas that conductor is at a positive potential, such as 12 volts, when transistor Q117 is nonconductive. The voltage at the collector of transistor Q118 is similarly applied to output conductor 344, and changes of that voltage are applied to the second counter stage 336. The state of stage 336 is reversed each time transistor Q118 is switched from a nonconductive to a conductive state, so that the state of stage 336 is switched each alternate time that the state of stage 334 is switched. The voltage at the collector of transistor Q119 in stage 336 is applied to output conductor 346, and the voltage at the collector of transistor Q120 in stage 336 is applied to output conductor 348. The changes in voltage at the collector of transistor Q119 are also applied via conductor 350 and a coupling network including resistor R1201 and capacitor C133 to the base of transistor Q121 in the third counter stage 338. When transistor Q119 in the second stage 336 changes from its conductive to its nonconductive state, the resultant rise in potential on conductor 350 results in the application of a positive-going pulse to the base of transistor Q121 to change the state of stage 338. While a diode (corresponding to diode D175 in the first stage) could be connected in series with the base of transistor Q121 to prevent the opposite change of state of transistor Q119 from changing the state of the stage 338, in the illustrated arrangement, the sequence is complete before this event would occur, so no diode is necessary. The output voltage appearing at the collector of transistor Q121 is applied to output conductor 352 and the output signal from transistor Q122 is correspondingly applied to conductor 354.

The base of the left-hand transistor Q117 of stage 334 is connected to conductor 266 through resistor R1113, the base of the right-hand transistor Q120 of stage 336 is connected to conductor 266 through resistor R1115, and the base of the right-hand transistor Q122 of stage 338 is connected to conductor 266 through resistor R1116. It will be recalled that prior to the completion of piloting of the system, conductor 266 was held at a positive potential, and as a result, the sequence counter 206 is initially set to and held in a state in which the left-hand transistor Q117 of stage 334 is conducting, in which the right-hand transistor Q120 of stage 336 is conducting and in which the right-hand transistor Q122 of stage 338 is conducting. At the completion of the piloting operation, this positive potential on conductor 266 is relieved so that the sequence counter 206 is prepared or enabled to change state but does not do so until an input signal is received via conductor 340. As a result, during the initial condition of the sequence counter 206, herein termed the "squeeze" condition, conductors 342, 348 and 354 are effectively grounded and the other output conductors, 344, 346 and 352 are at a positive potential.

When the potenital on conductor 340 changes abruptly from a positive value to ground potential, the state of stage 334 is reversed, reversing the state of stage 336, to step the sequence counter 206 to its second employed state herein characterized as the "weld" state or condition, in which transistors Q118, Q119, and Q122 are conducting and in which output conductors 344, 346 and 354 are grounded and the other three are at a positive potential. At the next negative-going pulse on conductor 340, the state of stage 334 is reversed (without reversal of the state of any other stage) so that transistors Q117, Q119 and Q122 are conducting and so that output conductors 342, 346 and 354 are essentially at ground potential and the other three are at a positive voltage. This is denominated the "hold" state. At the third negative-going pulse conductor 340, the state of stage 334 is reversed which reverses the state of stage 336, which reverses the state of stage 338. As the result, in this fourth or "off" condition, transistors Q118, Q120 and Q121 are conducting, output conductors 344, 348 and 352 are grounded and output conductors 342, 346 and 354 are at a positive potential. At the next step, only the state of stage 334 is reversed so that the ground potential is applied to conductors 342, 348 and 352, whereas conductors 344, 346 and 354 at a positive potential. This is the "stop" condition.

The voltages upon output conductors 342, 344, 346, 348, 352 and 354 are applied to matrix or translator 208 (FIG. 10). Matrix 208 comprises a plurality of diodes interconnecting the matrix input conductors 342, 344, 346, 348, 352 and 354, and the matrix output conductors 324, 326, 328, 330 and 332 in a selected pattern. That pattern is so selected that conductor 324 will be grounded (or effectively grounded) at all times except when the sequence counter 206 is in the "off" state, so that output conductor 326 will be grounded at all times except when the sequence counter is in the "hold" state, so that output conductor 328 will be grounded at all times except when the sequence counter is in the "weld" state, and so that output conductor 332 will be grounded at all times except when the sequence counter is in the "squeeze" state.

As an example, output conductor 324 is connected via a diode to sequence counter output lead 342 and is connected via another diode to sequence counter output lead 354, and will be effectively connected to ground unless both transistor Q117 and transistor Q122 are concurrently nonconductive. It will be seen from the foregoing description of the sequence counter that this event exists only during the "off" setting of the sequence counter so that under all other conditions, output conductor 324 is connected to the effectively ground potential at the collector one or more of the transistors in the sequence counter. Similarly, the "hold," "weld," and "squeeze" output leads 326, 328 and 332 are connected through diode combinations with the transistors of the sequence counter 206 to provide the desired condition in which each of those conductors is not connected to ground only during its respectively designated interval.

*Coincidence circuit*

The coincidence circuit 210 (FIG. 9) is, in the illustrated arrangement, controlled by the counter 202 (FIG. 8) and its matrix 204 and is controlled by the sequence counter 206 (FIG. 10) and its matrix 208, and, in turn, serves to control both the counter 202 and the sequence counter 206, operating in the illustrated arrangement, to control the application of a pulse from the generator 200 to the counter 202 and to the sequence counter 206 to reset counter 202 and to step sequence counter 206.

Coincidence circuit 210 is a form of "and" (or "not and") gate in which coincidence is established as a result of the absence of the application of ground potential to, at any time, any one of the leads 324, 326, 328, 330 and 332. If ground is applied concurrently to all of those leads, the coincidence or gate transistor Q123 is held in a nonconductive state. When matrix 204 fails to ground one of those conductors, that conductor may, at that matrix, either be connected to positive potential or may be "floating" with various settings of the switches in matrix 204, but neither condition will prevent transistor Q123 from becoming conductive. Matrix 208 will connect each of those either to ground or to a source of positive potential. The connection of any conductor to ground either at a matrix 204 or via matrix 208 causes that conductor to be at ground potential.

As an example, it will be recalled that sequence counter 206 is set, at the initiation of the operation of the system, to the "squeeze" condition so that each of the conductors 324, 326, 328 and 330 is connected, through a diode, to the collector of one or more conducting transistors in the sequence counter so that each of those leads is effectively at ground potential. The "squeeze" conductor 332, however, is, under this condition, connected through diodes only to collectors of sequence-counter transistors which are nonconductive so that the sequence-counter is not applying an inhibiting signal to conductor 332. However, conductor 332 is also connected, via lead 306 to the squeeze units switch including banks 280, 282 and 284 and to corresponding banks of the squeeze tens switch in the tens matrix 320. Assuming, for example, that the operator has set the squeeze tens switch to "0" and the squeeze units switch to "3," the end of lead 306 which is connected to the tens matrix 320 will, at this time, be "floating" since the squeeze tens switch will be in the condition in which the squeeze units switch is illustrated in the drawings. However, the squeeze units switch, in its "3" position, connects conductor 306 through diode D129, wiper 298, the No. 10 contact of bank 282, conductor 272, and to the collector of the right hand transistor in stage 252, which, at the initially set or "1" state of counter, is conducting. As a result, conductor 306 and hence conductor 332, to which it is connected, is held essentially at ground potential. As a result, under the assumed conditions, all of the conductors 324 to 332 are effectively grounded, with essentially a twelve volt drop appearing across resistors R181 to R185 which are connected to conductors 324, 326, 328, 330 and 332, respectively.

Each of these conductors is connected via an individual diode D166–D170, respectively, and a common diode D171 to the base of grounded emitter transistor Q123, with that base also being connected to a source of negative voltage through resistor R1122. Each of the diodes in matrix 210 is preferably a silicon having a forward voltage drop of approximately 0.5 volts.

With conductors 324–332 grounded, the base of transistor Q123 is negative with respect to the grounded emitter (and capacitor C137 connected between that base and ground is negatively charged) and transistor Q123 is held in a nonconductive state. The positive voltage at the collector of transistor Q123 is applied through diode D197 to a voltage divider including resistors R1119 and R1123, the lower terminal of the latter of which is connected to a source of negative 12 volt potential. The resultant potential appearing at the junction of resistors R1119 and R1123 is applied to the base of ground-emitter transistor Q124 to bias that transistor to a conductive state so that its collector, and hence conductor 340, is essentially at ground potential. While, as will be seen, pulses will be applied via another input circuit to transistor Q124 from conductor 248, they are ineffective to change the state of transistor Q124 in view of the bias applied thereto from transistor Q123.

When the first pulse is applied from counting gate Q124 and via conductor 246 to the counter 202, (FIG. 8), the state of that counter is changed to the "2" state, but transistor Q104 remains conducting so that conductor 272 is still essentially at ground potential and no change occurs in the coincidence circuit 210. At the second pulse applied via conductor 246 to counter 202, the state of that counter is shifted to "3" and transistor Q104 is rendered nonconductive. At this event, conductor 306 is no longer connected through any of the diodes D128 through D130 to the collector of a conducting counter transistor and conductor 332 rises to a potential approaching 12 volts positive. As a result, conventional current flows through diodes D170 and D171 (FIG. 9) and through resistor R1122, to tend to raise the potential at the base of transistor Q123 to a positive value, but this rise in voltage is delayed by the time required to change the charge on capacitor C137. At the end of that short delay, transistor Q123 is rendered conductive, which terminates the application of the positive potential at the collector of transistor Q123 to the base of transistor Q124 via diode D197 and resistor R1119. This "enables" or relieves the inhibition on transistor Q124 so that transistor Q124 is conditioned to become nonconductive, but it does not do so at this instant beacuse it is held conductive by a positive voltage applied to its base through resistor R1121. Thus, it will be recalled that the described change of state of transistor Q123 resulted from the stepping of counter 202 which occurred as a result of the change of counting gate Q126 (FIG. 9) from a nonconductive to a conductive state (in response to a pulse from transistor Q125), with a resultant reduction in potential on conductor 246 to approximately ground level. During the continuation of that condition, transistor Q126, which is directly coupled to transistor Q127, holds transistor Q127 in a noncoductive state so that conductor 248, connected with the collector of transistor Q127, is at a positive potential, and this positive potential, applied through diode D198 and resistor R1191, continues to hold transistor Q124 conducting even though transistor Q123 has become conductive. Thus, even though coincidence be established as a result of the application of a counting pulse to the counter, the state of transistor Q124 will not change at that instant. At the end of the particular half cycle of the alternating current from source 242, transistor Q125 will change state to change the state of transisor Q126 and raise the potential on conductor 246. This positive-going signal will not create any change in the state of counter 202, but it will render transistor Q127 conductive. The resultant reduction in potential on conductor 248 perimts transistor Q124 to become non-conductive so that the potential on the reset and sequence trigger lead 340 abruptly increases from a potential approaching ground to a positive potential. This change of potential on conductor 340 is applied to the sequence counter 206 (FIG. 10) and to the counter 202 (FIG. 8), but produces no result in the illustrated arrangement (although those units may be made to be responsive to positive-going signals if desired within the skill of the art). When transistor Q125 again changes state to change the state of transistor Q126 in a direction abruptly to change the potential on conductor 246 in a negative-going direction, transistor Q127 is rendered non-conductive, and the resultant increase in potential on conductor 248 turns transistor Q124 on to produce a negative-going change of potential on conductor 340. This negative-going signal is applied via conductor 340 to sequence counter 206 (FIG. 10) to step that counter, that is, to advance its count by one.

The negative-going signal on conductor 340 is also applied to each of the stages of counter 202 (FIG. 8) to reset that counter to its initial state. Thus, the signal on conductor 340 is applied to the base of transistor Q101 in the first stage 250 via a network comprising capacitor C117, resistor R165 and diode D206, and is applied, through similar networks, to the lefthand transistor of each pair of transistors in each of the other stages so as to reset the counter so that the right-hand transistor of each pair is conducting.

It will be observed that the same change of potential on conductor 246 which resulted in transistor Q124 (FIG. 9) becoming conductive and applying the resetting and sequence trigger pulse to conductor 340, also is applied as a pulse to be counted to counter 202. This pulse will not normally result in a stepping of the counter before resetting occurs because of the inherent time delay in the differentiating pulse input circuits of the stages of the counter. If there is a concurrent application of the stepping pulse and of the resetting pulse, the resetting pulse will dominate and override the stepping pulse so that the counter will be properly reset. If by any chance the counter is stepped and if that produces a change in the potential on the one of the output conductors 306, 310, 316 and 318, which is a that time controlling the coincidence circuit 210 (as selected by the sequence counter 206 (FIG. 10), the delay in the changing of the state of the coincidence gate Q123 as the result of the presence of capacitor C137 (FIG. 9), will insure that resetting occurs. However, normally, the advance of counter 202 by one count beyond the selected count will not produce any change in the potential of the selected one of the output conductors 306, 310, 316 and 318.

It will be noted that in the above described preferred arrangement, the establishment of coincidence only removes an inhibition and the signal which actually performs the resetting of the counter and the stepping of the sequence counter is derived directly from the pulse generator 200 rather than being derived from the counter 202. Transistor Q124 delivers the resetting and sequence triggering pulses. Until coincidence is established, it is inhibited or disabled to do so. However, upon the establishment of coincidence, it is enabled to do so and will do so at the next synchronizing pulse. If for any reason the first synchronizing pulse which is applied via conductor 248 to transistor Q124 after transistor is enabled does not successfully produce resetting of counter 202, all succeeding synchronizing pulses applied to conductor 248 are available to do the job as long as the inhibit remains off, as it normally does. As another advantage of this arrangement, all critically in the relationship between the time at which pulse generator 200 applies a pulse to counter 202 and the time at which resetting and sequence triggering pulse is applied to conductor 340 is relieved, while yet permitting accurate synchronism between the pulse on conductor 340 and the sine wave from source 242, since there is a time period between the time at which the pulse is applied via conductor 246 to the counter and the time at which the rest and sequence trigger pulse is applied to conductor 340 after the occurrence of coincidence. As a result, time delays, such as that established by capacitor C137, may be provided to avoid false coincidence due to transients, and propagation time losses are not added to the reset time. The system can be completely synchronous without rigorous circuit techniques.

It will be further noted that in the illustrated preferred arrangement, in which coincidence is established by the absence of ground potential at the selected one of the output conductors 306, 310, 316 and 318 of the matrix 204, a faulty electrical connection between any one of the switch wipers and the selected one of the contacts of that switch will not produce an extension of the selected count. In many prior art arrangements, defective circuitry or a faulty electrical contact will result in a substantial or effectively infinite extension of the selected count, which is an unsafe and dangerous condition. In the illustrated arrangement, a defective contact engagement will normally produce a reduction in the count and under no circumstance will it produce an extension of the count. As an example, if the connection between a wiper of bank 280 and contact 10 is not completed when it should be, the selected count will be reduced by up to one; if wiper 296 or 298 of bank 282 does not make proper engagement with No. 9 or No. 10 contact of that bank, the count will be reduced up to two counts; if wiper 300 does not make proper engagement with the selected contact of bank 284, the count will be reduced up to ten counts and similar comments apply to the switches of the tens matrix 320.

It will be observed that in the illustrated arrangements in which the reset and trigger pulse is applied to conductor 340 in response to the next cycle of the source 242 after incidence occurs, the switches and matrix 204 are actually set to a count one less than the count which the operator desires for that particular function, so that coincidence will occur one count in advance of the desired count. In the illustrated arrangement, the switch contacts are designated to avoid operator confusion. Thus, when the operator sets the squeeze units switch to a count of three, as in the above example, coincidence occurs as a result of the application to counter 202 of two pulses so that the third pulse will result in the transmission of the reset and sequence triggering signal via conductor 340.

After the counter is reset, it will commence again to count pulses on conductor 246, starting with the next pulse after the one which caused a reset and sequence triggering pulse to be applied to conductor 340 to reset counter 202 and to step sequence counter 206. Each of the functions is counted in sequence in this fashion, with the sequence counter 206 successively enabling the switches in matrix 204 to control the duration of the count for each of the successive functions and with that sequence counter further controlling other equipment to establish performance of the respective functions in the respective intervals.

Pressure

One function which is to be performed by the weld timer is the control of the application of pressure between the welding electrodes. The application of this pressure is controlled, in the known manner, by a solenoid valve 232 (FIG. 10). Solenoid valve 232 is energized under the control of contacts SVCR1a and SVCR1b of relay SVCR1, which is connected in the collector circuit of Q137 and is energized (if relay PCR has been operated to close its contacts PCR1b), when transistor Q137 is rendered conductive. Transistor Q136 is direct-coupled to and controls transistor Q137 and is effective, whenever it is non-conductive, to render transistor Q137 conductive to produce the application of pressure to the welding electrodes. This is in addition to the control of transistor Q137 via contacts PCR1a (FIG. 11) during the first-stage pilot operation as previously discussed.

The base of transistor Q136 is connected, through resistor R196, to the collector of transistor Q122 in the sequence counter 206 (FIG. 10). When the system is first placed in operation, transistor Q122 is rendered conductive, as previously described, as an element to setting the sequence counter to the initial "squeeze" condition. Consequently, during the squeeze interval, the collector of transistor Q122 is essentially at ground potential so that transistor Q136 is non-conductive and solenoid valve 232 is actuated. The same condition obtains during the weld interval and the hold interval. However, when sequence counter 206 is stepped to the "off" condition, transistor Q122 is rendered non-conductive, to render transistor Q136 conductive to render transistor Q137 non-conductive so as to terminate the application of pressure to the welding electrodes. Under the "stop" condition of the sequence counter, the same conditions exists, as will be seen.

Repeat and non-repeat

The system may be set for either repeat or non-repeat operation by the selective closing or opening of mechanically ganged switches SW2a and SW2b (FIG. 11). In non-repeat operation, in which switch SW2a is open, the sole input signal to transistor Q134, the repeat-non-repeat gate, is from the collector of transistor Q121 (FIG. 10) in the sequence counter via conductor 236. During "squeeze," "weld," and and "hold" time, transistor Q121 is non-conductive so that its collector is at a positive potential which is applied through resistor R193 and via conductor 236 to the base of transistor Q134 (FIG. 11) rendering that transistor conductive so that its collector is at a potential approaching ground. This potential is applied via conductor 238, and resistor R1126 (FIG. 9) to the base of transistor Q126 in the pulse generator, and does not inhibit operation of count trigger Q126. At the beginning of "off" time, transistor Q121 (FIG. 10) is rendered conductive and as a result transistor Q134 (FIG. 11) is rendered non-conductive. The resultant increase in the potential of the collector of that transistor is applied via conductor 238 and resistor R1126 (FIG. 9) to the base of transistor Q126 to hold that transistor in an "on" condition and hence to terminate the application of pulses to conductor 246. Accordingly, counting terminates at the beginning of "off" time, that is, at the end of "hold" time, in non-repeat operation.

If, on the other hand, switches SW2a and SW2b (FIG. 11) are set to the "repeat" position, the initiation of conduction in transistor Q121 at the beginning of "off" times does not render transistor Q134 (FIG. 11) non-conductive since the base of that transistor is also connected through switch SW2a, conductor 372, resistor R186 (FIG. 10) to the collector of transistor Q117, and transistor Q117 is, during the "off" interval, conductive and the substantially ground potential at its collector is applied to the base of transistor Q134 to maintain conduction in that transistor. Accordingly, counting is not inhibited and the unit continues the count during "off" time. However, at the beginning of the "stop" interval, both transistors Q117 and Q122 in the sequence counter 206 are conducting so that transistor Q134 (FIG. 11) is rendered non-conductive and the transmission of pulses to be counted terminates at the end of "off" time.

With transistor Q134 (FIG. 11) conductive during "squeeze," "weld" and "hold" and, in repeat operation, during "off" time, transistor Q133 is held non-conductive and the positive potential of the collector thereof is applied via resistor R1200 to the base of transistor Q131 for a purpose to be noted. In addition, the positive potential of the collector of transistor Q133 is applied via a network including resistor R1152 to the base of transistor Q132 to hold that transistor in a conductive state. The current through that conductor serves as a latching current for relay PCR1, as previously described.

At the end of "off" time in repeat operation, transistor Q134 becomes non-conductive which renders transistor Q133 conductive, which causes transistor Q132 to become non-conductive and relay PCR1 tends to release. However, with switch SW2b set to the "repeat" mode, the change in potential at the base of transistor Q131 produced as a result of the conductivity of transistor Q133 results in transistor Q131 becoming non-conductive, producing a rapid rise in the potential of its collector and hence a rapid rise in the potential at conductor 374 which is applied through resistor R1117 and diode D207 to the base of transistor Q122 so as to render that transistor conductive and thereby render transistor Q121 non-conductive. As a result of this operation, the sequence counter 206 is reverted to the condition previously denominated as the "squeeze" condition under which relay PCR1 is prevented from dropping out and the system is re-prepared for recycling of the entire operation.

It may be noted that diode D110 (FIG. 11) is provided as a safety feature. If, on repeat operation, transistor Q132 shorted out, the cycle would repeat continuously. However, by provision of diode D110, any such shorting of transistor Q132 will result in the application of essentially ground potential at the collector thereof which will effectively clamp the collector of transistor Q131 at ground potential and hence preclude the application of a positive pulse to the base of transistor Q122 and hence prevent recycling.

Firing pulser

The firing pulser comprising transistor Q145–Q148 (FIG. 12) is controlled conjointly by the firing delay circuit 218 (FIG. 12), the power factor angle detection circuit 220 and the heat control circuit 222 (FIG. 13).

The firing delay circuit 218 comprises a transistor Q135 the base of which is connected by conductor 376 and individual resistors R189 and R190 to the collectors of transistors Q118 and Q119 (FIG. 10) in the sequence counter 206. When, but only when these transistors are conjointly conducting, which occurs only during the "weld" interval, transistor Q135 is non-conductive so that its collector is at a positive potential which is applied via means including resistor R1164 and resistor R1163 to charge capacitor C139. The change in state of transistor Q135 preferably occurs at line phase zero and the circuit including capacitor C139 establishes a time delay thereafter which, in normal practice, is set for around 87½° after line phase zero. At that time, the potential at the upper electrode of capacitor C139, and hence at the base of transitsor Q138, has risen to the point at which transistor Q138 becomes conductive.

Transistor Q138 is, with transistor Q139, an element of a type of Schmitt trigger circuit which rapidly changes state when the input voltage reaches a preselected value, as previously described herein. At that event, transistor Q139 is rendered non-conductive. That transistor is direct coupled to transistor Q140 so as to render that transistor conductive and the resultant reduction in collector potential thereof is applied through diode D189, conductor 384, and through resistor R1189 to the base of transistor Q145 in the firing pulser 224, as well as through resistor 1196 to the base of transistor Q147. This is one of the three conditions which must concurrently exist before transistors Q145 and Q147 will be permitted to perform their functions. It may be noted at this point that at the end of weld time, capacitor C139 can rapidly discharge through diode D188 and transistor Q135 so that while the circuit including capacitor C135 imposes a delay at the initiation of firing, it does not significantly delay the termination of firing.

Another condition controlling the action of transistors Q145 and Q147 is imposed by the power factor angle circuit 220 (FIG. 12). Transformer T103 comprises a secondary winding 378 (FIG. 12) and a primary winding 380 (FIG. 13). A primary winding 380 is connected directly between the anodes of ignitrons IG3 and IG4 (FIG. 13). at any time that contacts NWCR1a and NWCR1b are closed. These contacts are closed whenever relay NWCR1 (FIG. 11) is operated as it is whenever relay PCR1 is operated to close its contact PCR1c (FIG. 11).

One-half at the center-tapped secondary winding 378 (FIG. 12) is connected through an input circuit to the base of transistor Q141, and the other half is correspondingly connected to the base of transistor Q142. The collector of transistor Q141 is connected via conductor 386 and through resistor R1188 to the base of transistor Q145 and the collector of transistor Q142 is similarly connected via conductor 388 and through resistor R1195 to the base of transistor Q147.

Non-conductivity of transistor Q141 inhibits or disables transistor Q145 and non-conductivity of transistor Q142 inhibits or disables transistor Q147. Unless there is anode voltage between the ignitrons IG3 and IG4 (FIG. 13), both transistors Q141 and Q142 will be non-conducting and the firing pulser 224 will be disabled because no differential voltage appears across the primary of transformer T103. However, if that anode voltage exists, transistors Q141 and Q142 will be alternately conductive so as alternately to enable transistors Q145 and Q147 to control the lead-trail sequence.

The third control upon the firing pulser 224 is exerted by the heat control 222 (FIG. 13). This circuit is energized from an alternating current source 390, which is preferably the same as source 242 (FIG. 9) and source 244 (FIG. 13). Alternating current from source 390 is applied to transformer T101 to a conventional form of phase shifting circuit 392 which delivers to the primary winding of transformer T102 an alternating voltage selectively shifted in phase from that of source 390. The alternating voltage appearing across the upper half of the center-tapped secondary winding of transformer T102 is applied to the input circuit of transistor Q143 including resistor R1182, capacitor C142, the lower electrode of which is grounded, diode D192 shunting capacitor C142, and biasing resistor R1183, the lower terminal of which is connected to a source of negative biasing potential. As a result, a signal which selectively lags the voltage from source 390 is applied to the base of transistor Q143 which conducts when the potential applied to its base rises to a preselected value. Transistor Q143, with its associated circuits, is biased to clip so that the voltage at its collector, as applied to conductor 394, is somewhat in the form of a square wave. During portions of the positive half cycle of the voltage across the upper half of the secondary winding of transformer T102, transistor Q143 conducts to reduce the voltage on conductor 394 from a positive potential to a potential approaching ground value and as that alternating voltage attenuates, transistor Q143 becomes nonconductive to restore the potential applied to conductor 394 to the positive value. This signal is applied via resistor R1187 (FIG. 12) to the base of transistor Q145. The voltage appearing across the lower end of the center-tapped secondary winding of transformer T102 is correspondingly applied to transistor Q144 which applies approximately square wave signals to conductor 396 and hence through resistor R1194 (FIG. 12) to the base of transistor Q147. The signals on conductors 394 and 396 are, of course, 180° out of phase with one another.

When the signals applied to conductors 394, 386 and 384 consurrently reach ground potential, transistor Q145 (FIG. 12) become nonconductive. The point at which these conditions concur is established when the latest of the conductors 384, 386 and 394 to attain ground potential reaches that potential. Normally, the signal from the heat control circuit 222 (FIG. 13), applied via conductor 394 will be the last such event, although in the first cycle, the delay imposed by the firing delay circuit 218 may exceed the delay imposed by the heat control circuit 222, in which event it is the firing delay circuit 218 which causes transistor Q145 to become nonconductive.

When transistor Q145 becomes nonconductive, the change in potential at its collector is applied to a coupling and differentiating network including capacitor C144 connected to the base of transistor Q146. Transistor Q146 is rendered conductive and it continues to be conductive for a time delay interval (which is normally short relative to the period of the alternating current) determined by the time constant of the circuit including capacitor C144. In a preferred arrangement, transistor Q146 is designed to remain conductive for approximately 50 microseconds. The resultant current pulse through the primary winding 400 of transformer T104 is applied via the secondary winding 402 (FIG. 13) of transformer T104 to the ignitron firing circuit 216. It will be observed that when transistor Q146 becomes conductive, the voltage at its emitter rises due to the potential drop across emitter resistor R1193 which regeneratively tends to bias transistor Q145 non-conductive so that the combination of transistors Q145 and Q146 operates in the nature of a monostable multi-vibrator.

Correspondingly, at any time that the voltages on conductors 396, 388 and 384 (FIG. 12) concurrently reach ground potential, transistor Q147 in the trail portion of the firing pulser is rendered nonconductive and regeneratively coacts with transistor Q148 to deliver a short duration pulse to the primary winding 404 of transformer T105 thereby to induce a corresponding pulse in the secondary winding 406 (FIG. 13) thereof.

*Firing circuit*

The firing circuit 216 (FIG. 13) selectively controls the point in the half cycles of the alternating current from source 244 at which ignitrons IG3 and IG4 (or equivalent control elements) will be fired so as to control the delivery of energy to welding transformer T112, the secondary winding of which is connected to the welding electrodes which in turn are engageable with the work.

Ignitrons IG3 and IG4 are connected in anti-parallel or back-to-back relationship and conduct during alternate half cycles. An anode firing type of firing circuit is employed with a silicon controlled rectifier being used to control the application of energy to the input circuits of each ignitron. The firing circuit is enabled whenever relay NWCR1 (FIG. 11) is energized to close its contacts NWCR1a and NWCR1b (FIG. 13), as it is whenever relay PCR (FIG. 11) is operated to close its contacts PCR1c. The input circuit for ignitron IG3 may be traced from source 244, contacts NWCR1a, inductance 101L, diodes D150 and D152 in series, silicon controlled rectifier SCR10, the ignitor and pool of ignitron IG3, through the primary of welding transformer T112 and back to source 244. Diodes D150 and D152 are each shunted with the resistor R800 and R802, respectively, and the silicon controlled rectifier output circuit is shunted with a resistor R803. In the constructed arrangement, resistors R800 and R802 were equal and each had about half the resistance of resistor R803, resistors R800 and R802 each being about 50,000 ohms in resistance and resistor R803 being about 100,000 ohms. The input pulse appearing across secondary winding 402 of transformer T104 is applied via a pulse forming network including resistors R806 and R810, capacitor C150 and diode D154 to the gate-cathode circuit of controlled rectifier SCR10 to cause that rectifier to conduct to thereby initiate conduction in ignitron IG3. The firing circuit associated with ignitron IG4 operates in a similar fashion during the other half cycle.

An important feature of the firing circuit is the means for precluding improper or premature firing of rectifier SCR10 (and of its counterpart in the other firing circuit) in response to a rapid change of the voltage applied thereacross. It is recognized that if a silicon controlled rectifier is subjected to a change of applied voltage which is very rapid, that rectifier may falsely conduct even though there is no input signal applied and even though the applied voltage is within the capabilities of the rectifier. In a firing circuit of the illustrated type, the voltage which is applied to rectifier SCR10 can rapidly change due to transient conditions. It can rapidly change, for example, as a result of the closure of contacts NWCR1a and can falsely operate for one-half cycle at that time even though there is no input signal applied thereto via transformer T404. The means for preventing this false operation comprises a network including inductor 101L, connected in series with silicon controlled rectifier SCR10, and a resistance capacitance network including capacitor C156 and resistor R808 connected, effectively, in parallel with rectifier SCR10 (and also, in the particular illustrated embodiment, in parallel with the input circuit of ignitron IG3). Series choke 101L impedes any high frequency rate of change of the applied direct voltage and the network including capacitor C156 tends to shunt high frequency components resulting from any rapid rate of change of the applied voltage in bypass of rectifier SCR10.

Another feature of the firing circuit is the provision of means for limiting the magnitude of the back voltage applied across the silicon controlled rectifier. This takes a form of a diode, such as D152 connected in series with the silicon controlled rectifier, with both the diode and the rectifier being shunted by a resistor. In the illustrated arrangement, two diodes, D150 and D152, with individual shunting resistors, are provided because of limitations upon the peak back voltage ratings of available diodes. However, but one diode is necessary if its rating is appropriate or more than two can be employed if their ratings so dictate.

When the voltage is such as to bias rectifier SCR10 in a forward direction, resistors R800, R802 and R803 have no significant effect upon the system and the forward voltage drop across diodes D150 and D152 is essentially zero (in comparison with the applied voltage of source 244, which may be, for example, 480 volts) so that effectively the entire line voltage appears across rectifier SCR10 during that half cycle in which it is forward biased. During the other half cycle, the back voltage is divided between rectifier SCR10 and the two diodes D150 and D152. With the above noted parameters, approximately one-half of the voltage appears across the two diodes D150 and D152 so that but one-half of the line voltage is applied as a back voltage across rectifier SCR10.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In combination, a source of recurring electrical pulses, timing means comprising counting means for counting said pulses, a plurality of individually settable selector means connected to said counting means for providing a selectable output indication at selected counts of said counting means, a steppable sequence circuit means having a plurality of terminals and a plurality of sequential conditions and including means for providing a preselected output indication to said terminals in accordance with its condition, control means effective when enabled to step said sequence circuit and to reset said counting means, and enabling means individual to each of said selector means and to each of said terminals and effective in response to said preselected output indication at the individual one of said terminals concurrently with the output indication selected by the selector means individual thereto for enabling said control means.

2. In combination, a plurality of control means each individual to a preselected function, sequence control means for successively enabling said control means, timing means effective at selectable times to actuate the enabled control means, and inhibiting means for preventing one of said control means from responding to said timing means even though enabled by said sequence control means including means controlled by said timing means.

3. In combination, a plurality of control means each individual to a preselected function, sequence control means for successively enabling said control means, timing means effective at selectable times to actuate the enabled control means, and inhibiting means for preventing one of said control means from responding to said timing means even though enabled by said sequence control means including means controlled by said timing means, and means effective until said timing means has first timed a selectable interval for disabling said one of said control means and effective when said timing means has timed said selectable interval for enabling said one of said control means.

4. In combination, a plurality of control means each individual to a preselected function, sequence control means for successively enabling said control means, timing means effective at selectable times to actuate the enabled control means, and inhibiting means for preventing one of said control means from responding to said timing means even though enabled by said sequence control means including means controlled by said timing means, means effective until said timing means has first timed a selectable interval for disabling said one of said control means and effective when said timing means has timed said selectable interval for enabling said one of said control means and for resetting said timing means.

5. In combination, a source of recurring electrical pulses, timing means comprising binary counting means for counting said pulses, matrix means for translating the output of said counting means to a decimal output, a plurality of switching means connected to said counting means for providing a selectable output indication at selected decimal outputs from said matrix means, a steppable sequence circuit having a plurality of terminals and a plurality of sequential conditions and including means for providing a preselected output indication to said terminals in accordance with its condition, actuatable means effective when actuated to step said sequence circuit and to reset said counting means, and a coincidence circuit individual to each of said switching means and to each of said terminals and effective in response to said preselected output indication at the individual one of said terminals concurrently with the output indication selected by the switching means individual thereto for actuating said actuatable means.

6. In combination, a source of recurring electrical pulses, timing means comprising counting means for counting said pulses, a plurality of switching means connected to said counting means for providing a selectable output indication at selectable counts of said counting means of one and larger, a steppable sequence circuit having a plurality of terminals and a plurality of sequential conditions and means for providing a preselected output indication to said terminals in accordance with its condition, actuatable means effective when actuated to step said sequence circuit and to reset said counting means, a coincidence circuit individual to each of said switching means and to each of said terminals and effective in response to said preselected output indication at the individual one of said terminals concurrently with the output indication selected by the switching means individual thereto for actuating said actuatable means, and means for selectively changing the effective sequence of said sequence circuit.

7. In combination, a source of recurring electrical pulses, timing means comprising counting means for counting said pulses, a plurality of switching means connected to said counting means for providing a selectable output indication at selectable counts of said counting means of one and larger, a steppable sequence circuit having a plurality of terminals and a plurality of sequential conditions and means for providing a preselected output indication to said terminals in accordance with its condition, actuatable means effective when actuated to step said sequence circuit and to reset said counting means, a coincidence circuit individual to each of said switching means and to each of said terminals and effective in response to said preselected output indication at the individual one of said terminals concurrently with the output indication selected by the switching means individual thereto for actuating said actuatable means, and means including selectively operable means effective when said sequence circuit is stepped to one of its conditions for immediately stepping said sequence circuit to another one of its conditions.

8. In combination, a source of recurring electrical pulses, timing means comprising counting means for counting said pulses, a plurality of switching means connected to said counting means for providing a selectable output indication at selectable counts of said counting means of one and larger, a steppable sequence circuit having a plurality of terminals and a plurality of sequential conditions and means for providing a preselected output indication to said terminals in accordance with its condition, actuatable means effecitve when actuated to step said sequence circuit and to reset said counting means, a coincidence circuit individual to each of said switching means and to each of said terminals and effective in response to said preselected output indication at the individual one of said terminals concurrently with the output indication selected by the switching means individual thereto for actuating said actuatable means, and means including selectively operable means effective when said sequence circuit is stepped to one of its conditions for immediately stepping said sequence circuit to another one of its conditions for producing an effectively zero-count setting for said one condition of said sequence circuit.

9. In combination, a source of recurring electrical pulses, timing means comprising counting means for counting said pulses and for producing a discrete output indication at each count, switching means connected to said counting means for providing a selectable output indication at a selected count of said counting means and for terminating said output indication at and in response to the next count of said counter, actuatable output means, and means connected to said switching means and effective at the termination of said selectable output indication for actuating said output means.

10. In combination, a source of recurring electrical pulses, timing means comprising resettable counting means for counting said pulses and for producing a discrete output indication at each count, switching means connected to said counting means for transmitting a selected one of said discrete output indications, and control means connected to said switching means and actuatable in response to the pulse following the one which caused said counting means to produce said selected output indication.

11. The combination of claim 10 further including means responsive to said control means for resetting said counting means.

12. The combination of claim 10 in which said switching means is calibrated in terms of a selectable number of pulses, in which said switching means transmits a selected signal in response to the completion of the counting of one less than the number of pulses selected from the calibrations of the switching means, in which said switching means transmits a different signal at all other counts, and in which said output means is responsive to the change of signal from said selected signal to said different signal which occurs in response to the counting of a number of pulses equal to the number of pulses selected from the calibrations of the switching means.

13. In combination, a source of recurring electrical pulses, timing means comprising counting means for counting said pulses, a plurality of switching means connected to said counting means for providing a selectable output indication at selected counts of said counting means, a steppable sequence circuit having a plurality of terminals and a plurality of sequential conditions and including means for providing a preselected output indication to said terminals in accordance with its condition, actuatable means effective when actuated to step said sequence circuit and to reset said counting means, a coincidence circuit individual to each of said switching means and to each of said terminals and effective in response to said preselected output indication at the individual one of said terminals concurrently with the output indication selected by the switching means individual thereto for actuating said actuatable means, an actuatable switch, control means effective in response to actuation of said switch for controlling the operation of said sequence circuit, and means for maintaining said sequence circuit in operation for a preselected portion of its sequence despite deactuation of said switch comprising means controlled by said sequence counter and connected to one of said terminals responsive to a preselected output indication at said terminal for maintaining said control means effective.

14. The combination of claim 13 further including a second switch having two positions, and means effective when said switch is in one of said positions for maintaining said control means effective to the end of the complete sequence of said sequence circuit.

15. In combination, a source of recurring electrical pulses, timing means comprising first counting means for counting said pulses and for producing output indications indicative of the count and resettable to zero count, steppable second counting means, control means including a plurality of selectively enableable settable means and effective in response to the output indication from said first counting means indicative of the count selected by a first enabled one of said settable means to step said second counting means one count and to reset said first counting means to zero, and means for successively enabling said settable means in accordance with the count of said second counting means.

16. In combination, a source of recurring electrical pulses, timing means comprising first counting means for counting said pulses and for producing output indications indicative of the count and resettable to zero count, steppable second counting means, and control means including settable means connected to the output of said first counting means and effective in response to an output indication from said first counting means indicative of the count selected by said settable means to step said second counting means one count and to reset said first counting means to zero.

17. The combination of claim 16 in which said second counting means is stepped in response to the application of a pulse thereto and in which said control means steps said second counting means by applying a pulse thereto produced as a result of said output indication from said first counting means.

18. The combination of claim 16 in which said second counting means is stepped in response to the application of a pulse thereto and in which said control means steps said second counting means by applying a pulse thereto derived from said source of recurring electrical pulses.

19. The combination of claim 18 in which said control means includes gate means effective when enabled to transmit a pulse from said source to said second counting means and in which said gate means is enabled in response to said output indication from said first counting means.

20. The combination of claim 16 in which said first counting means is reset in response to the application of a pulse thereto and in which said control means resets said first counting means by applying a pulse thereto produced as a result of the said output indication from said first counting means.

21. The combination of claim 16 in which said first counting means is reset in response to the application of a pulse thereto and in which said control means resets said first counting means by applying a pulse thereto derived from said source of recurring electrical pulses.

22. The combination of claim 21 in which said control means includes gate means effective when enabled to transmit a pulse from said source to said second counting means and in which said gate means is enabled in response to said output indication from said first counting means.

23. The combination of claim 16 in which said first counting means is reset in response to the application of a pulse thereto, in which said second counting means is stepped in response to the application of a pulse thereto, and in which said control means resets said first counting means and steps said second counting means by applying a pulse thereto produced as a result of the said output indication from said first counting means.

24. The combination of claim 16 in which said first counting means is reset in response to the application of a pulse thereto, in which said second counting means is stepped in response to the application of a pulse thereto, and in which said control means resets said first counting means and steps said second counting means by applying a pulse thereto derived from said source of recurring electrical pulses.

25. In combination, a timer for timing intervals and resettable to initial zero condition, a plurality of control means individually operable, when enabled, at individually selectable intervals of time timed by said timer, and means responsive to the operation of any one of said control means for enabling a different one of said control means and for resetting said timer to said initial zero condition.

26. In combination, a source of recurring electrical pulses, timing means comprising counting means for counting said pulses and resettable to an initial zero condition, a plurality of control means individually operable, when enabled, at individually selectable output counts of said counting means, and means responsive to the operation of any one of said control means for enabling a different one of said control means and for resetting said counter to said initial zero condition.

27. In combination, a timer for timing intervals and resettable to a uniform initial condition, a plurality of selector means controlled by said timer and individually effective, when enabled, at individually selectable intervals of time timed by said timer, steppable sequence circuit means having a plurality of sequential conditions for sequentially enabling said selector means, and means including said selector means and effective after the completion of the timing by said timer of an individual interval selected by an enabled one of said selector means for resetting said timer to said uniform initial condition and for stepping said sequence circuit means to the next one of said conditions.

28. In combination, control means including a plurality of individual means each individual to a preselected function, sequence control means advanceable to sequentially enable said individual means, timing means resettable to zero and effective at selectable times to effectuate the enabled one of said individual means, and means controlled by said control means and effective in response to the effectuation of any one of said individual means for resetting said timing means to zero and for advancing said sequence control means.

29. In combination, a source of recurring electrical pulses, timing means comprising first counting means connected to said source for counting said pulses, second counting means for counting pulses, control means effective, when enabled, to apply a pulse from said source to said second counting means, and means including selecting means effective at any selected count of said first counting means for enabling said control means.

30. In combination, a source of recurring electrical pulses, timing means comprising first counting means connected to said source for counting said pulses, second counting means for counting pulses, control means effective, when enabled, to apply a pulse from said source to said second counting means and for changing the setting of said first counting means, and means including selecting means effective at any selected count of said first counting means for enabling said control means.

31. In combination, a source of recurring electrical pulses, timing means comprising first counting means connected to said source for counting said pulses settable to a zero condition, second counting means for counting pulses, control means effective, when enabled, to apply a pulse from said source to said second counting means and for resetting said first counting means to said zero condition, and means including selecting means effective at any selected count of said first counting means for enabling said control means.

32. In combination, a source of recurring electrical pulses, timing means comprising first counting means connected to said source for counting said pulses and changeable in setting in response to the application of a signal thereto, second counting means for counting pulses, control means effective, when enabled, to apply a pulse from said source to said second counting means and for applying a signal to said first counting means, and means including selecting means effective at any selected count of said first counting means for enabling said control means.

33. In combination, a source of recurring electrical pulses, timing means comprising first counting means connected to said source for counting said pulses and changeable in setting in response to the application of a setting pulse thereto, second counting means for counting pulses, control means effective when enabled to apply a pulse from said source to said second counting means and to apply a pulse from said source to said first counting means as a setting pulse, and means including selecting means effective at any selected count of said first counting means for enabling said control means.

34. In combination, a source of recurring electrical pulses, timing means comprising first counting means connected to said source for counting said pulses, circuit means including a plurality of selecting means each effective, when enabled, to produce a signal in response to the attainment by said first counting means of the count selected by the enabled one of said selecting means, control means including second counting means responsive to a succession of pulses applied thereto to successively enable said selective means, and means responsive to said signal for applying a pulse to said second counting means.

35. In combination, a source of recurring electrical pulses, timing means comprising first counting means connected to said source for counting said pulses, circuit means including a plurality of selecting means each effective, when enabled, to produce a signal in response to the attainment by said first counting means of the count selected by the enabled one of said selecting means, control means including second counting means responsive to a succession of pulses applied thereto to successively enable said selective means, and means responsive to said signal for applying a pulse from said source to said second counting means.

36. In combination, a source of recurring electrical pulses, timing means comprising first counting means connected to said source for counting said pulses resettable to a zero condition, circuit means including a plurality of selecting means each effective, when enabled, to produce a signal in response to the attainment by said first counting means of the count selected by the enabled one of said selecting means, control means including second counting means responsive to a succession of pulses applied thereto to successively enable said selective means, and means responsive to said signal for applying a pulse to said second counting means and for resetting said first counting means to zero.

37. In combination, a source of recurring electrical pulses, timing means comprising first counting means connected to said source for counting said pulses resettable to a zero condition in response to a resetting pulse applied thereto, circuit means including a plurality of selecting means each effective, when enabled, to produce a signal in response to the attainment by said first counting means of the count selected by the enabled one of said selecting means, control means including second counting means responsive to a succession of pulses applied thereto to successively enable said selective means, and means responsive to said signal for applying a pulse to said second counting means and a resetting pulse to said first counting means.

38. In combination, a source of recurring electrical pulses, timing means comprising first counting means connected to said source for counting said pulses resettable to a zero condition in response to a pulse applied to a resetting terminal thereto, circuit means including a plurality of selecting means each effective when enabled to produce a signal in response to the attainment by said first counting means of the count selected by the enabled one of said selecting means, control means including second counting means responsive to a succession of pulses applied thereto to successively enable said selective means, and means responsive to said signal for applying a pulse from said source to said second counting means and to said resetting terminal.

39. In a system for timing the duration of an initiated function, a source of recurring electrical pulses, a plurality of conductors, timing means comprising counting means for counting said pulses and for applying to each of said conductors one of two first and second preselected potentials and for changing the potentials applied to said conductors in accordance with the count, a lead, multiple-position selective switching means connected to said conductors for selecting a desired count and for applying to said lead said first preselected potential except at said selected count, and control means connected to said switching means and effective in response to the absence of said first preselected potential on said lead for terminating the function.

40. The combination of claim 39 in which said control means further includes said source and in which control means terminates said function at the one of said pulses which immediately follows the one of said pulses constituting said preselected count.

41. The combination of claim 39 in which said multiple-position selective switching means comprises movable wiper means selectively electrically engageable with a plurality of contact means, and in which an improper absence of said electrical engagement precludes the application of said first preselected potential to said lead whereby said control means prematurely terminates that function.

42. The combination of claim 39 in which said counting means comprises a multiple-stage binary counting means in which one of said conductors is connected to each of said stages, and in which said multiple-position switching means is connected to a plurality of said conductors in a selective pattern.

43. The combination of claim 39 in which said control means includes terminating means effective unless disabled to terminate said function, and circuit means effective in response to the existence of said first preselected potential on said lead for disabling said terminating means.

44. In combination, a conductor, means for recurrently changing the potential on said conductor in alternate directions, an actuatable device, and means including timing means for actuating said actuatable device after a preselected number of changes of the potential on said conductor and in controlled time relation therewith comprising counting means for counting the changes of potential on said conductor, control means connected to said counting means and effective for actuating said actuatable device at one of said signals after it is enabled, and means connected to said counting means for enabling said control means in response to the counting by said counting means of one less than said preselected number of changes of the potential on said conductor.

45. In combination, a conductor, means for recurrently changing the potential on said conductor in alternate directions, an actuatable device, and means including timing means for actuating said actuatable device after a preselected number of changes in one direction of the potential on said conductor and in controlled time relation therewith with one of said changes in said one direction comprising counting means for counting the changes of potential in said one direction on said conductor, control means connected to said counting means and effective for actuating said actuatable device at one of said signals after it is enabled, and means connected to said counting means for enabling said control means in response to the counting by said counting means of one less than said preselected number of changes of the potential on said conductor in said one direction.

46. In a system for timing synchronously with a source of sinusoidal alternating current, a conductor, means for applying a signal to said conductor at each cycle of the sinusoidal alternating current and in controlled phase relation therewith, an actuatable device, and means for actuating said actuatable device after a preselected number of said signals and in controlled time relation with the phase of the sinusoidal alternating current comprising a counting means for counting the number of said signals, selectively enableable control means for actuating said actuatable device at the next one of said signals after it is enabled, and means connected to sid counting means for enabling said control means in response to the counting by said counting means of one less than said preselected number of signals.

47. The combination of claim 46 in which said actuatable device is actuatable be one of said signals and in which said control means is connected to said conductor and is effective when enabled to transmit one of said signals to said actuatable device.

48. In a control system for a welder in which a series of functions are to be performed in sequence during a series of successive time intervals, the combination of a source of pulses, a sequence counter steppable in response to said pulses for establishing a sequential performance of said functions and successively steppable in response to succesive pulses to "squeeze," "weld," "hold," and "off" states and steppable in response to the next pulse to a "stop" state, a switch settable to repeat and nonrepeat positions, and means effective when said switch is set in repeat condition and effective in response to the stepping of said counter to said "stop" state for changing the state of said counter to said "squeeze" state.

49. In combination, a source of recurring electrical pulses, timing means comprising counting means for counting said pulses comprising a plurality of output conductors and a plurality of binary stages connected to said conductors and applying to each thereof first or second potentials in a pattern indicative of the instant count, a lead, control means connected to said lead and effective only if said lead is at said first potential, a plurality of banks of selectively settable switches selectively connected to said conductors and means connected to said switches and to said lead for applying said second potential to said lead from said counting means until said counting means reaches said selected count.

50. In combination, a source of recurring electrical pulses, timing means comprising counting means for counting said pulses comprising a plurality of output conductors and a plurality of binary stages connected to said conductors and applying to each thereof first or second potentials in a pattern indicative of the instant count, a lead, control means connected to said lead and effective only if said lead is at said first potential, a plurality of banks of selectively settable switches selectively connected to said conductors, and means connected to said switches and to said lead for applying said second potential to said lead from said counting means until said counting means reaches said selected count comprising a source of potential substantially equal to said first potential, a resistor, circuit means including a diode connecting said resister to each of said banks, and means for connecting said resistor to said control means.

51. In combination, a source of recurring electrical pulses, counting means for counting said pulses comprising a plurality of output conductors and a plurality of binary stages connected to said conductors and applying to each thereof first or second potentials in a pattern indicative of the instant count, a lead, control means connected to said lead and effective only if said lead is at said first potential, a plurality of banks of selectively settable switches selectively connected to said conductors, and means connected to said switches and to said lead for applying said second potential to said lead from said counting means until said counting means reaches said selected count comprising a source of potential substantially equal to said first potential, a resistor, circuit means including a diode connecting said resistor to each of said banks, and means including a diode for connecting said resistor to said control means.

52. In combination, a source of recurring electrical pulses, counting means for counting said pulses comprising a plurality of output conductors and four binary stages each connected to an individual one of said conductors and applying to each thereof first or second potentials in a pattern indicative of the instant count, a plurality of banks of switches each having a plurality of contacts and wiper means selectively engageable therewith, means for connecting preselected ones of said electrical contacts to said conductors, an output lead, and means connecting said wiper means to said output lead.

53. In combination, a source of recurring electrical pulses, counting means for counting said pulses comprising a plurality of output conductors and four binary stages each connected to an individual one of said conductors and applying to each thereof first or second potentials in a pattern indicative of the instant count, a plurality of banks of switches each having a plurality of contacts and wiper means selectively engageable therewith, means for connecting preselected ones of said electrical contacts to said conductors, an output lead, and means connecting said wiper means to said output lead comprising diode means individual to each of said banks.

54. The combination of claim 53 in which there are three banks of switches, in which each of said banks includes ten electrical contacts, in which said wiper means are ganged and rotatable to any one of ten positions indicative of the number of pulses counted by said counter, and in which said output lead is at said second potential only at the count of said counter selected by the setting of said ganged wiper means.

55. The combination of claim 53 in which there are only three banks of switches, in which each of said banks includes ten electrical contacts, in which said wiper means are ganged and rotatable to any one of ten positions indicative of the number of pulses counted by said counter, in which each of said binary stages applies to the conductor individual thereto one of two potentials in accordance with the state thereof, and in which said output lead is at said second potential only at the count of said counter selected by the setting of said ganged wiper means.

56. The combination of claim 46 in which said means for applying a signal to said conductor at each cycle of the sinusoidal alternating current and in controlled phase relation therewith comprises a two-state multivibrator responsive to an input signal of a critical amplitude to change from its first to its second state and effective to a change of said input signal in one direction from said critical amplitude to change from its second to its first state, means for applying the sinusoidal alternating current input signal to said multivibrator, and means for synchronizing said changes from the first to the second stable state of said multivibrator with the zero-degree point of said sinusoidal input signal comprising means for applying to said multivibrator a direct input voltage having an amplitude such that said critical amplitude is achieved at the zero-degree point of said sinusoidal input signal.

References Cited
UNITED STATES PATENTS 2,521,774  9/1950  Bliss _____ 328—39
3,214,695  10/1965  Betz _____ 328—75

ARTHUR GAUSS, *Primary Examiner.*

ROBERT H. PLOTKIN, *Assistant Examiner.*

U.S. Cl. X.R.

219—111, 114; 315—252; 328—48, 72, 81

UNITED STATES PATENT OFFICE
CERTIFICATE OF CORRECTION

Patent No. 3,452,283                                                    June 24, 1969

George O'Neal, Jr.

It is certified that error appears in the above identified patent and that said Letters Patent are hereby corrected as shown below:

Column 3, line 59, "condutcive" should read -- conductive --. Column 4, line 47, "throgh" should read -- through --. Column 10, line 74, cancel "the". Column 12, lines 14 to 17, cancel "reset circuit 81 (Fig. 1) since the negative pulse through capacitor C14 is grounded through rectifier RE 33. For similar reasons, this negative-going signal on conductor 134 is not effective to change the condition of transistor" and insert the same after "counter" in line 75, column, 11. Column 16, line 72, cancel "rent flows in a circuit including resistor RS1b and rectifier". Column 17, line 8, "I" should read -- It --. Column 19, line 59, "1liustrated" should read -- illustrated --; line 61, "wnding" should read -- winding --. Column 21, line 5, "unijection" should read -- unijunction --. Column 24, line 54, "IC1 and IC2" should read -- IG1 and IG2 --. Column 25, line 23, "54R" should read -- 64R --. Column 26, line 7, "operations" should read -- operation --. Column 29, line 36, "banks" should read -- bank --; line 67, "only" should read -- solely --. Column 31, line 21, after "pulse" insert -- upon --; line 73, "couner" should read -- counter --. Column 32, line 41, after "of" insert -- the --; line 45, "resisors" should read -- resistors --. Column 33, line 33, "noncoductive" should read -- nonconductive --; line 44, "transisor" should read -- transistor --. Column 34, line 17, "a" should read -- at --; line 38, after "after" insert -- that --; line 43, "critically" should read -- criticality --; line 51, "rest should read -- reset --; line 59, "will be further" should read -- will further be --. Column 35, line 43, after "of" insert -- transistor --; line 68, "conditions" should read -- condition --. Column 36, line 4, cancel "and", first occurrence; line 25, "times" should read -- time --. Column 37, line 49, "A primary" should read -- Primary --; line 51, "(Fig. 13)." should read -- (Fig. 13) --. Column 38, line 40, "consurrently" should read -- concurrently --. Column 47, line 8, "sid" should read -- said --.

Signed and sealed this 11th day of August 1970.

(SEAL)
Attest:

EDWARD M. FLETCHER, JR.                                    WILLIAM E. SCHUYLER, JR.
Attesting Officer                                                Commissioner of Patents